United States Patent
Shimizu et al.

[11] Patent Number: 6,141,852
[45] Date of Patent: *Nov. 7, 2000

[54] METHOD FOR ASSEMBLING PHOTOGRAPHIC FILM AND PHOTOGRAPHIC FILM CASSETTE

[75] Inventors: Makoto Shimizu; Toshiro Esaki; Tadayoshi Shibata; Koichi Takahashi, all of Kanagawa, Japan

[73] Assignee: Fuji Photo Film Co., Ltd., Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/924,138

[22] Filed: Sep. 5, 1997

Related U.S. Application Data

[60] Continuation of application No. 08/542,715, Oct. 13, 1995, abandoned, which is a division of application No. 08/100,966, Aug. 3, 1993, Pat. No. 5,479,691.

[30] Foreign Application Priority Data

| Aug. 3, 1992 | [JP] | Japan | 4-206653 |
| Oct. 12, 1992 | [JP] | Japan | 4-272987 |
| Dec. 7, 1992 | [JP] | Japan | 4-326982 |

[51] Int. Cl.⁷ ............... B23P 11/00; B23P 19/00
[52] U.S. Cl. ................ 29/430; 29/806; 53/430; 242/520
[58] Field of Search ............ 29/806, 430; 53/430, 53/118; 242/520

[56] References Cited

U.S. PATENT DOCUMENTS

| 3,499,202 | 3/1970 | Napor et al. ............... 29/806 X |
| 4,080,711 | 3/1978 | Kawada et al. ............ 53/118 X |
| 4,574,563 | 3/1986 | Shimizu ..................... 53/430 |
| 4,614,019 | 9/1986 | Shimizu et al. ............. 29/450 |
| 4,947,536 | 8/1990 | Suzuki et al. ............... 29/30 |
| 4,965,931 | 10/1990 | Suzuki et al. ............... 29/783 |
| 4,974,316 | 12/1990 | Suzuki et al. ............... 29/806 |
| 5,038,464 | 8/1991 | Suzuki et al. ............... 29/806 |
| 5,136,778 | 8/1992 | Bell et al. ..................... 29/806 |
| 5,325,577 | 7/1994 | Bigelow et al. ............. 29/806 X |

FOREIGN PATENT DOCUMENTS

| 0082675 | 12/1982 | European Pat. Off. |
| 63-4036 | 2/1988 | Japan |
| 2222946 | 9/1990 | Japan |
| 3182451 | 8/1991 | Japan |
| 9004254 | 4/1990 | WIPO |

*Primary Examiner*—P. W. Echols
*Attorney, Agent, or Firm*—Sughrue, Mion, Zinn, Macpeak & Seas, PLLC

[57] ABSTRACT

A photographic film cassette manufacturing apparatus, has a perforator for providing a long film with perforations and a cutter for cutting the long film into individual filmstrips to be contained in the film cassette driven synchronously with transport of the long film. A magnetic recording head for recording data on a magnetic recording layer of the long film is driven in synchronism with the perforator and the cutter. The long film is transported in a first direction before being cut into the individual filmstrips. In cooperation with the cutting, a trailing end of the individual filmstrip in the first direction is moved in a direction which is reverse to the first direction to secure the trailing end to the spool. A cassette shell consisting of a pair of shell halves is temporarily assembled by mating the shell halves together while containing a spool inside the shell halves, and thereafter opened to an extent that confining elements still confine the position of flanges of the spool. The trailing end of the filmstrip is inserted into the opened cassette shell and secured to the spool.

5 Claims, 18 Drawing Sheets

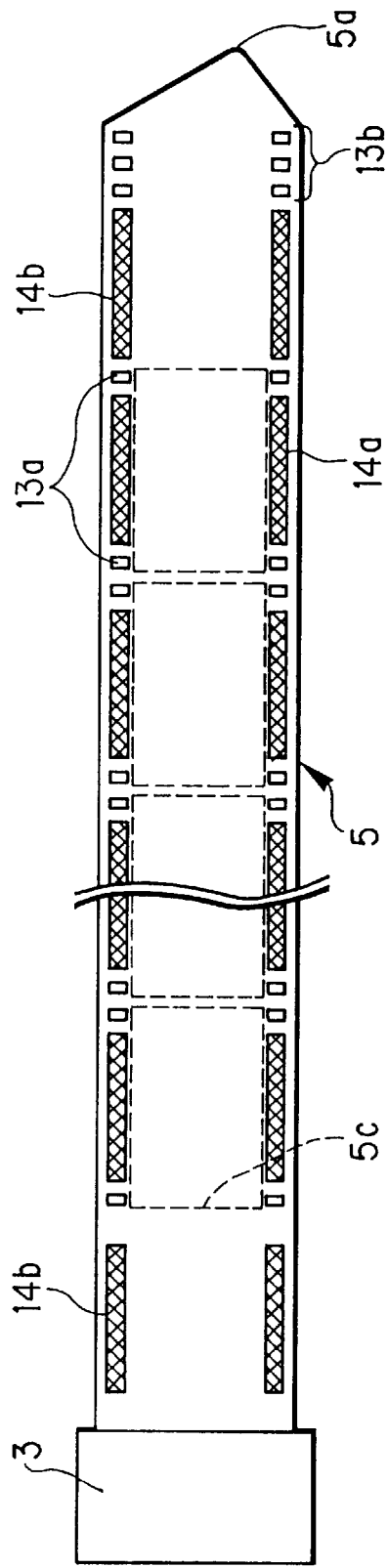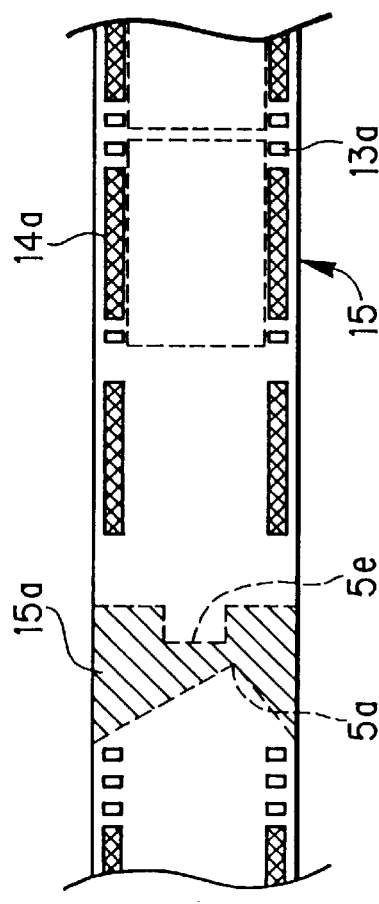

METHOD FOR ASSEMBLING PHOTOGRAPHIC FILM AND PHOTOGRAPHIC FILM CASSETTE

This is a Continuation of application Ser. No. 08/542,715, filed Oct. 13, 1995, now abandoned which in turn is a division of application Ser. No. 08/100,966, filed Aug. 3, 1993, which is now U.S. Pat. No. 5,479,691, issued on Jan. 2, 1996.

BACKGROUND OF THE INVENTION

1. Field of the Invention

The present invention relates to a method of, and an apparatus for, manufacturing photographic film and photographic film cassettes. More particularly, the present invention relates to a method of, and an apparatus for, manufacturing a photographic filmstrip having a predetermined length and perforations, and data magnetically recorded thereon. The present invention also relates to a method of, and an apparatus for, cutting and winding the photographic filmstrip. The present disclosure is based on the disclosures of Japanese Patent Appln. Nos. 4-206653, 4-272987 and 4-326982 filed Aug. 3, Oct. 12 and Dec. 7, 1992 respectively, which disclosures are incorporated herein by reference.

2. Description of the Related Art

A photographic film cassette is constituted of a cassette shell, and a roll of photographic film accommodated in the cassette shell in light-tight fashion. 35 mm (135 type) film cassettes or cartridges are well known.

Generally, a photographic filmstrip to be loaded in a cassette shell is manufactured by the following process. First, a sheet of film having a photosensitive emulsion layer applied on one surface thereon is slit to a predetermined width, and a consequent long strip of photographic film is wound about a rotary shaft, which is driven by a motor, into a roll. The long film is drawn from the roll and transported at a constant speed along a manufactured line. In the manufacturing line, a perforator forms perforations in the film at regular intervals. The long film having the perforations formed therethrough is then cut to predetermined lengths to form individual filmstrips.

An automatic film cutting and winding apparatus which sequentially performs the process of drawing the long film by a predetermined length from the roll, cutting the long film at the predetermined length from the roll into individual filmstrips, transferring the individual filmstrip from the cutting position to a securing position, securing the filmstrip to a spool, and winding the filmstrip on the spool, is well known.

Such an automatic film cutting and winding apparatus is disclosed, for example, in Japanese Patent Publication 63-4036, JPA 2-222946 and JPA 3-182451. In the apparatus disclosed in Japanese Patent Publication 63-4036, there is a film feeding and measuring section, a cutting section, an intermediate holder for storing a length of the long film that is approximately equal to the predetermined length of the individual filmstrip, a feed roller section for feeding the filmstrip out of the intermediate holder, and a film securing section, sequentially disposed in that order along a film transport path for feeding the long film from the roll toward the spool. The transient stock in the intermediate holder contributes to shortening a stand-by period in each of the above sections.

In the apparatus disclosed in JPA 2-222946, a film feeding and measuring section, a cutting section, a feed roller section and a film securing section are sequentially disposed on the film transport path in order from the roll, to feed a filmstrip cut from the long film to a spool and secure the filmstrip to the spool. Thereafter, the feed roller section releases the remaining portion of the filmstrip therefrom, and the filmstrip is wound onto the spool.

The most popular 135 type photographic film cassette has a cassette shell constructed of cylindrical barrel made of sheet metal and a pair of caps attached to opposite ends of the barrel. A spool with a photographic film wound thereon is loaded in the cassette shell. According to a method as known from Japanese Patent Publication 2-691, the photographic film is wound on the spool, and then subsequently wrapped with the barrel and the caps in a darkroom. Also a method for assembling such a conventional film cassette is known from Japanese Patent Publication 60-48748 wherein a temporary assembled cassette shell is partly disassembled in a film loading section disposed in a darkroom, to insert the spool with a film wound thereon into the cassette shell. Thereafter, the cassette shell is reassembled.

Furthermore, a photographic film cassette of a leader advancing type is disclosed, for example, in U.S. Pat. Nos. 4,834,306 and 4,846,418, and JPA 3-37645, wherein a cassette shell is constructed of resin molded products and a leading end of a filmstrip wound on a spool can be advanced to the outside of the cassette shell by rotating the spool in an unwinding direction. Because the leading end of the filmstrip is located inside the cassette shell not only after exposure but also before loading of this type of film cassette, light-shielding of the contained filmstrip is improved, and handling of the film cassette, during the loading and the removal thereof is easier as compared with conventional 135 type film cassettes.

Recently, a photographic film has been disclosed in U.S. Pat. Nos. 4,860,037 and 4,864,332, on which film data specific to the photographic film is magnetically recorded. The film data represents, for example, an ID code, a lot number and a film speed of the film, as well as the number of available frames in the film. The data is read by an appropriate device incorporated in a camera when the photographic film is loaded in the camera. Based on the data, a suitable photography mode of the camera is automatically selected, for example, to facilitate taking a high quality photograph.

When finishing the photographic film in a photo-lab, it is necessary to always correlate the respective photographic films with the customers throughout the photo-finishing process. Therefore, data usable for such a correlation is also recorded on the photographic film. Japanese Patent Publication 3-2905 discloses a photographic filmstrip having discrimination data recorded in the vicinity of a perforation in associated with an exposure position in which an image frame is to be exposed. The discrimination data is binary data representing numerical values specific to each individual filmstrip, such as slit data, a supplementary number, etc. And the discrimination data is magnetically recorded and/or photographically recorded as a latent bar code image or the like.

In order to record such magnetic data on the photographic filmstrip, a magnetic recording layer is provided in a predetermined position on the long film, on a side thereof which is opposite from the photosensitive emulsion layer, before the long film is wound in a roll.

However, when recording data on the magnetic recording layer, it has been very difficult to precisely position the data in correspondence with each image frame exposure position on the film, because the long film is transported at a very high speed during the film manufacturing, for example, at a speed of several tens of the ordinary film advancing speed in cameras, to increase production efficiency. Besides, it is impossible to exactly read the magnetic data from the photographic film unless each recording position has a definite positional relation to the image frame exposure position which is designated by a perforation or the like. Data reading is necessary during manufacturing, for checking if the data has been properly recorded on the magnetic recording layer.

When securing a first end of the filmstrip, it is necessary to guide the first end into an engaging portion of the spool with accuracy, and protect the filmstrip from being scratched or blushed during the guiding. Such scratching or blushing may result in lowering the quality of the filmstrip to a certain degree.

In spite of this fact, conventional automatic film cutting and winding apparatus guide the filmstrip through a relatively long distance toward the spool. That is, the filmstrip is transported in the same direction as in the measuring and cutting process toward the spool. Therefore, the first end to be secured to the spool is the forward end in the transporting direction, and the securing position, where the first end is secured to the spool, is spaced apart from the cutting position of the long film, by at least a distance corresponding to the length of the individual filmstrip.

As a result, the first end cannot always be accurately positioned, because of shrinkage or curling of the filmstrip, variance in the transport amount of the filmstrip, and also fluctuation of curvature of the filmstrip during the slitting operation. Therefore, it has been very difficult to quickly and precisely guide and secure the first end of the filmstrip to the spool without scratching and blushing thereof. This hinders rapid manufacturing of the film cassette. This problem is especially serious because photographic films are being manufactured thinner and thinner in the interest of minimizing materials and lightening cameras.

In the above-described leader advance type photographic film cassette, it is necessary, for permitting the film advancing operation, to prevent loosening of the roll of the photographic film wound on the spool when the spool is rotated in the unwinding direction. For this purpose, a photographic film cassette wherein flanges, which confine the opposite sides of the film roll on the spool, are formed from relatively soft material and/or formed separately from the spool core is known. When the spool is mounted in the cassette shell, the flanges are pressed against the opposite sides of the film roll by confining members formed integrally inside the cassette shell. Thereby, the film roll is tightly held by the flanges at opposite sides thereof and thus is prevented from loosening.

When manufacturing such a film cassette, if the so photographic film is first wound on the spool having the soft or separate flanges thereon, and thereafter the spool is mounted in the cassette shell, the flanges can be deformed or damaged by the confining members during the mounting of the spool in the cassette shell or during closing of the cassette shell. This is because the position of the flanges is unstable when not pressed by the confining members. For the same reason, the flanges are frequently not properly positioned inside the confining member in conventional manufacturing processes.

The present invention is directed to solving the above-described problems and thus an object of the present invention is to provide a method of, and an apparatus for, manufacturing a photographic film having a magnetic recording layer, wherein data can be magnetically recorded exactly in proper position relative to each image frame exposure position and/or relative to either end of each individual filmstrip.

Another object of the present invention is to provide a method of, and an apparatus for, manufacturing a photographic film cassette, wherein the positioning of the photographic filmstrip can be performed with accuracy when securing the filmstrip to the spool.

A further object of the present invention is to provide a method of, and an apparatus for, manufacturing a photographic film cassette, which makes it possible to reliably wind the filmstrip into is the cassette shell in the manufacturing process even when the spool has soft flanges or when the cassette shell and/or the flanges are separate parts from the spool core.

SUMMARY OF THE INVENTION

To achieve the above and other objects, according to the present invention, a perforator is driven synchronously with transport of a long film, and a magnetic recording head is driven in synchronism with the perforator. Thereby, magnetic data is positioned precisely in association with each image frame exposure position or area.

When recording data magnetically on at least one end of an individual filmstrip, a cutter for cutting the long film into the individual filmstrips is driven synchronously with transport of the long film, and a magnetic recording head is driven in synchronism with the cutter.

The present invention transports the long film in a first direction during the measuring process for measuring a predetermined length of an individual filmstrip, holds a trailing end of the individual filmstrip in relation to the first direction immediately before or after cutting the filmstrip from the long film, and moves the filmstrip by a predetermined distance in a second direction, which is reverse to the first direction, while holding the trailing end to secure the trailing end to a spool. Accordingly, the filmstrip can be guided through a relatively short path to the spool with accuracy while avoiding scratching or blushing of the filmstrip.

When manufacturing a photographic film cassette that includes a spool having soft or elastic flanges formed separately from a spool core and fitted to the spool core, the cassette shell is temporarily assembled by mating shell halves together while containing the spool fitted with the flanges inside the shell halves. The cassette shell is then opened to an extent that confining elements still contact the flanges and confine the position of the flanges. One end of the filmstrip is then inserted into the opened cassette shell to be secured to the spool, and thereafter, the shell halves are mated together again to close the cassette shell. Then, the spool is rotated to wind the filmstrip into the cassette shell. Accordingly, the confining elements can not interfere with the flanges, so that the flanges are not damaged by the confining elements and are positioned properly.

BRIEF DESCRIPTION OF THE DRAWINGS

Other objects and advantages of the present invention will become apparent based on the following detailed description of the preferred embodiments when read in connection with the accompanying drawings, wherein like reference numerals designate like or corresponding parts throughout the several views, and wherein:

FIG. 2 is an explanatory view of an example of a photographic filmstrip contained in the photographic film cassette shown in FIG. 1;

FIG. 3 is an explanatory view of a portion of a long strip of photographic film which is cut into the individual filmstrips having a predetermined length each;

DETAILED DESCRIPTION OF THE PREFERRED EMBODIMENTS

Figure 1:
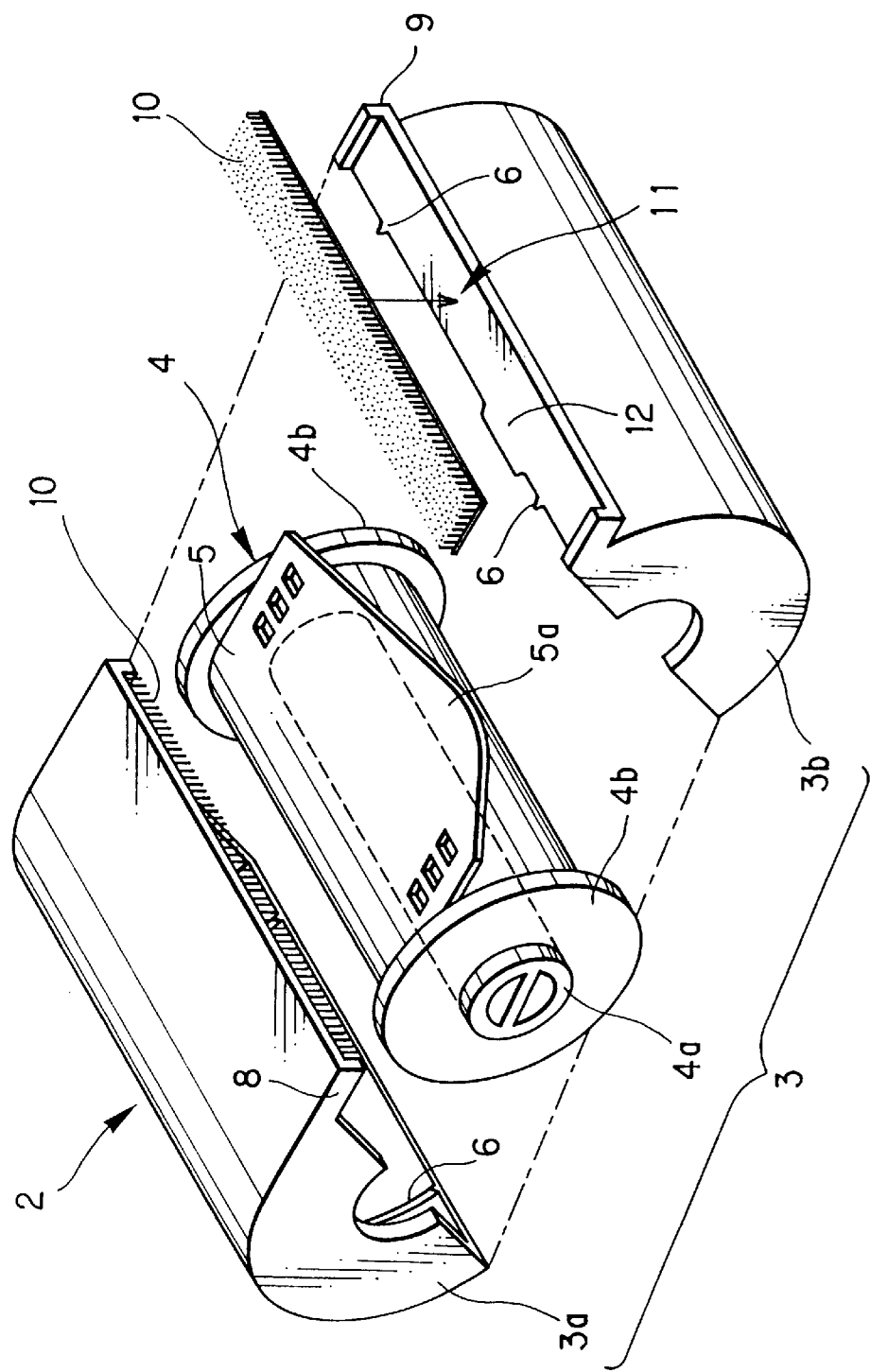
FIG. 1 is an exploded perspective view of a photographic film cassette to be manufactured according to the preferred embodiment of the present invention.

An example of a photographic film cassette manufactured according to a preferred embodiment of the present invention is shown in FIG. 1. The cassette 2 is composed of a cassette shell 3, a spool 4 rotatably mounted in the cassette shell 3 and a photographic filmstrip 5 having a predetermined length. A pair of shell halves 3a and 3b constitute the cassette shell 3. The spool 4 includes a cylindrical spool core or hub 4a and a pair of flanges 4b disposed on opposite ends of the spool core 4a. In an initial state, the entire length of the photographic filmstrip 5, hereinafter referred to as simply a filmstrip, is tightly wound about the spool core 4a and located inside the cassette shell 3 with the lateral sides thereof confined by the flanges 4b. The outermost convolution of the roll of the filmstrip 5 is confined by ridges 6 formed integrally on the inside surface of the shell halves 3a and 3b. Therefore, the roll of the filmstrip 5 will not come unwound in the initial state.

The opposite ends of the spool core 4a are exposed to the outside of the cassette shell 3, but not protrude beyond the lateral end faces of the cassette shell 3. The upper and lower shell halves 3a and 3b have respective port portions 8 and 9 which define a film passageway 11 of the filmstrip 5 when the shell halves 3a and 3b are joined together. Light-trapping members 10 are cemented on the opposing inner walls of the port portions 8 and 9. A separating claw 12 is formed at an inner portion of the port portion 9 of the lower shell half 3b.

When the spool 4 is rotated in a clockwise direction in FIG. 1, by coupling a rotating device to one end of the spool core 4a, the roll of filmstrip 5 is rotated along with the spool 4 in the cassette shell 3. At that time, a leading end 5a of the filmstrip 5 is peeled off the next inward convolution of the roll, by the separator claw 12, and guided to the outside of the cassette shell 3 through the film passage mouth 11. This function is referred to as a film advance function.

As shown in FIG. 2, the photographic filmstrip 5 has perforations 13a formed therethrough in association with a leading margin and a trailing margin of each image frame exposure area 5c. The perforations 13a are used for positioning the image frame exposure area 5c. Also, perforations 13b are formed in the leading end 5a on opposite lateral sides thereof for facilitating catching of the leading end 5a by a feed mechanism. A magnetic recording track 14a is formed on each lateral side of the image frame exposure area 5c between adjacent perforations 13a which indicate the leading and trailing margins of the same image frame exposure area 5c. These magnetic recording tracks 14a have film data, such as an identification code, recorded thereon. The magnetic recording tracks 14b are also provided in the vicinity of the leading end 5a and/or a trailing end 5e of the filmstrip 5 along the lateral sides thereof.

The perforations 13a and 13b and the magnetic recording tracks 14a are formed in a long strip of photographic film (hereinafter referred to as a long film) 15. A magnetic recording layer is previously provided on one surface of the long film 15 opposite to the photosensitive emulsion surface thereof, in the form of a pair of continuous zones extending along the opposite lateral sides of the long film 15. After forming the perforations 13a and 13b and recording the film data on the magnetic recording tracks 14a and 14b, the long film 15 is cut into the individual filmstrips 5 in a manner as shown in FIG. 3, wherein a hatched area 15a shows a cut-out portion.

Figure 4:
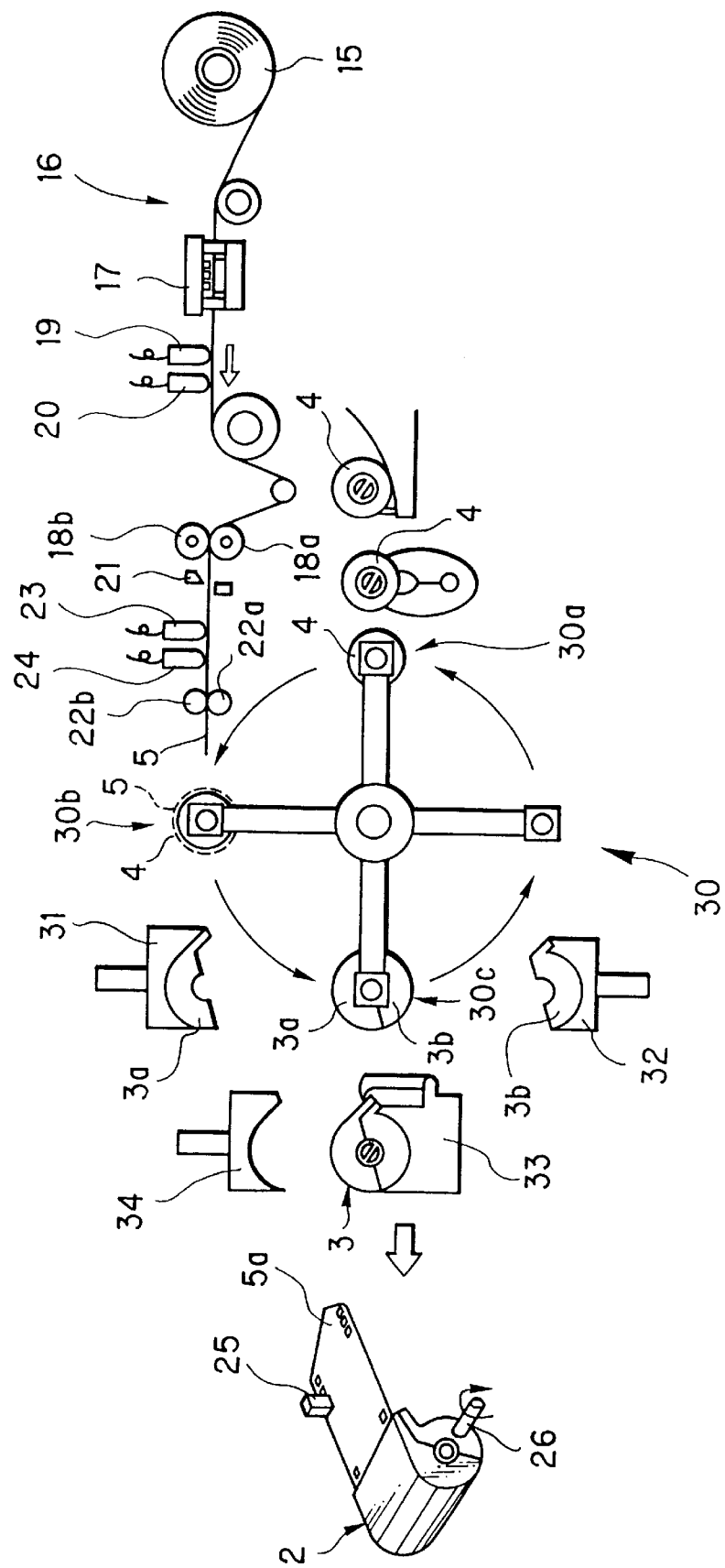
FIG. 4 is an explanatory view of the overall construction of a cassette manufacturing apparatus according to a preferred embodiment of the present invention.

FIG. 4 illustrates a cassette manufacturing apparatus for performing a preferred embodiment of a method of the present invention. The long film 15, on which the photosensitive emulsion layer and magnetic recording layer are formed, is wound in a roll and fitted on a rotary shaft in a film manufacturing section 16 of the cassette manufacturing apparatus. The rotary shaft is driven by a motor (not shown) to feed the long film 15 longitudinally to a transporting system including a pair of feed rollers 18*a* and 18*b*. The feed rollers 18*a* and 18*b* transport the long film 15 at a predetermined speed, e.g., about 1 to 5 m/second.

First, the perforations 13*a* and 13*b* are formed by a perforator 17 which is driven synchronously with the film transport. Next, a magnetic recording head 19 records data on the magnetic recording track 14*a* in synchronism with the perforator 17. The length of the long film 15 extending between the perforator 17 and the recording head 19 is maintained constant. Just downstream of the recording head 19, a magnetic reading head 20 is disposed to read and check the data having been recorded by the recording head 19. The data recorded by the recording head 19 may include the frame number, the film speed, the name of film manufacturer, and the like.

The long film 15 having the perforations 13*a* and 13*b* formed therein and as the film data recorded thereon, is transported to a cutter 21. The cutter 21 is also driven synchronously with the film transport, to cut the long film 15 in the way shown in FIG. 3, to provide the individual filmstrip 5. The filmstrip 5 is transported by another pair of feed rollers 22*a* and 22*b* toward a cassette assembling section 30.

A second magnetic recording head 23 is disposed downstream of the cutter 21, to record film data in the vicinity of the leading end 5*a* and/or the trailing end 5*e* of the filmstrip 5 along the magnetic recording track 14*b*. The second magnetic recording head 23 is driven synchronously with the cutter 21. Also the length of the filmstrip 5 extending between the cutter 21 and the second recording head 23 is disposed just downstream from the second recording head 23 to read and check data having been recorded by the second recording head 23. The data recorded by the second recording head 23 may include the total available number of frames, the film speed, the name of film manufacturer, a lot number, data relating to manufacture, and the like. The film data may be appropriately located in the magnetic recording tracks 14*a* and 14*b*.

The cassette assembling section 30 is constituted of a spool receiving station 30*a* where the spool 4, formed in another process, is received in the cassette assembling section 30, a film winding station 30*b* where the filmstrip 5 is wound on the spool 4, and a shell assembling station 30*c* where the spool 4 having the filmstrip 5 wound thereon is mounted in the cassette shell 3.

The shell assembling station 30*c* is provided with an upper holder 31 and a lower holder 32 which are movable up and down to move toward or away from each other. The upper holder 31 holds the upper shell half 3*a* by suction force and transports the same downward to cover the upper half portion of the film roll 5 wound on the spool 4, whereas the lower holder 32 supports the lower shell half 3*b* and transports the same upward to cover the lower half portion of the film roll 5. After the shell halves 3*a* and 3*b* are thus mated together, the upper and lower holders 31 and 32 are retracted to allow transfer of the cassette shell 3 containing the spool 4 and the filmstrip 5 therein onto a carrier 33 by a transport device (not illustrated). Then, an ultrasonic horn 34 secures the shell halves 3*a* and 3*b* to each other by ultrasonic welding.

The operation of the above-described cassette manufacturing apparatus is described below.

The photosensitive emulsion layer is provided on one surface of the long film 15 and the magnetic recording layer is provided on the opposite surface outside the image frame exposure areas 5*c*. Thereafter, the long film 15 is wound in a roll and loaded in the cassette manufacturing apparatus.

The feed rollers 18*a* and 18*b* are driven by a step motor (not shown) to intermittently stop transporting the filmstrip 15 at predetermined intervals. The perforator 17 forms the perforations 13*a* and 13*b* in the long film 15 when the filmstrip 5 is intermittently stopped. Thereafter, the recording head 19 writes the film data on the magnetic recording track 14*a* while the long film 15 is transported by the feed rollers 18*a* and 18*b*. Because the length of the long film 15 between the perforator 17 and the recording head 19 is maintained constant, the location of the magnetic recording tracks 14*a* relative to the perforations 13*a* is also maintained unchanged, so that the film data is recorded in a predetermined location in relation to each image frame exposure area 5*c*. The recording head 19 is brought into contact with the long film 15 during the recording only, and is retracted therefrom at other times to avoid damage the surface of the film 15.

The reading head 20 reads the data recorded by the recording head 19 while the filmstrip 15 is transported. Because the reading head 20 is disposed just downstream of the recording head 19, the data can be reproduced at the substantially same time as the recording thereof. Therefore, specific synchronization of the reproduced data with the recording position during the reproduction is unnecessary. This contributes to simplifying the process of data checking.

The long film 15 is further transported to the cutter 21 to be cut into the individual filmstrip 5 to be contained in the film cassette 2. The second pair of feed rollers 22*a* and 22*b* are also driven by a step motor to intermittently stop transporting the long film 15 at predetermined intervals. The cutter 21 cuts the long film 15 when the transporting is intermittently stopped. Thereafter, while the individual filmstrip 5 is transported by the feed rollers 22*a* and 22*b*, the second recording head 23 records the film data on the magnetic recording track 14*b* of the leading end 5*a* and/or that of the trailing end 5*e*. Because the length of the filmstrip 5 between the cutter 21 and the second recording head 23 is maintained constant, the location of the magnetic recording track 14*b* is maintained unchanged.

The filmstrip 5, cut to the predetermined length and having the film data recorded thereon, is transported by the feed rollers 22*a* and 22*b* to the film winding station 30*b* of the cassette assembling section 30, wherein the trailing end 5*e* is secured to the spool 4 previously received in the spool receiving station 30*a*. Thereafter, the entire length of the filmstrip 5 is wound on the spool 4 by a winding device (not illustrated).

The spool 4, with the filmstrip 5 wound thereon, is transported to the shell assembling station 30*c*, wherein the upper and lower shell halves 3*a* and 3*b* are mated together to rotatably mount the spool 4 between the shell halves 3*a* and 3*b*. Thereafter, the ultrasonic horn 34 applies ultrasonic vibration to the cassette shell 3 to join the shell halves 3*a* and 3*b* together into one body.

The photographic film cassette 2 thus manufactured is subjected to inspection for inspecting the construction and function of the film cassette 2. Only those film cassettes 2 which have passed the inspection are packed and shipped for sale.

Instead of checking the data recorded by the recording head 23 directly after the recording, it is possible to check the data recorded on the magnetic recording track 14*b* of the leading end 5*a* simultaneously with inspecting the filmadvance-function of the finished photographic film cassette 2. In this embodiment, a magnetic reading head 25 for reading the data recorded on the magnetic recording track 14b of the leading end 5a is disposed outside of the film passage mouth 11 of the photographic film cassette 2 which is positioned in a film-advance-function inspecting section, wherein the spool 4 is rotated by a rotating device 26 to advance the leading end 5a of the filmstrip 5 to the outside through the film passage mouth 11. Thereafter, the filmstrip 5 is rewound into the cassette shell 3.

Figure 5:
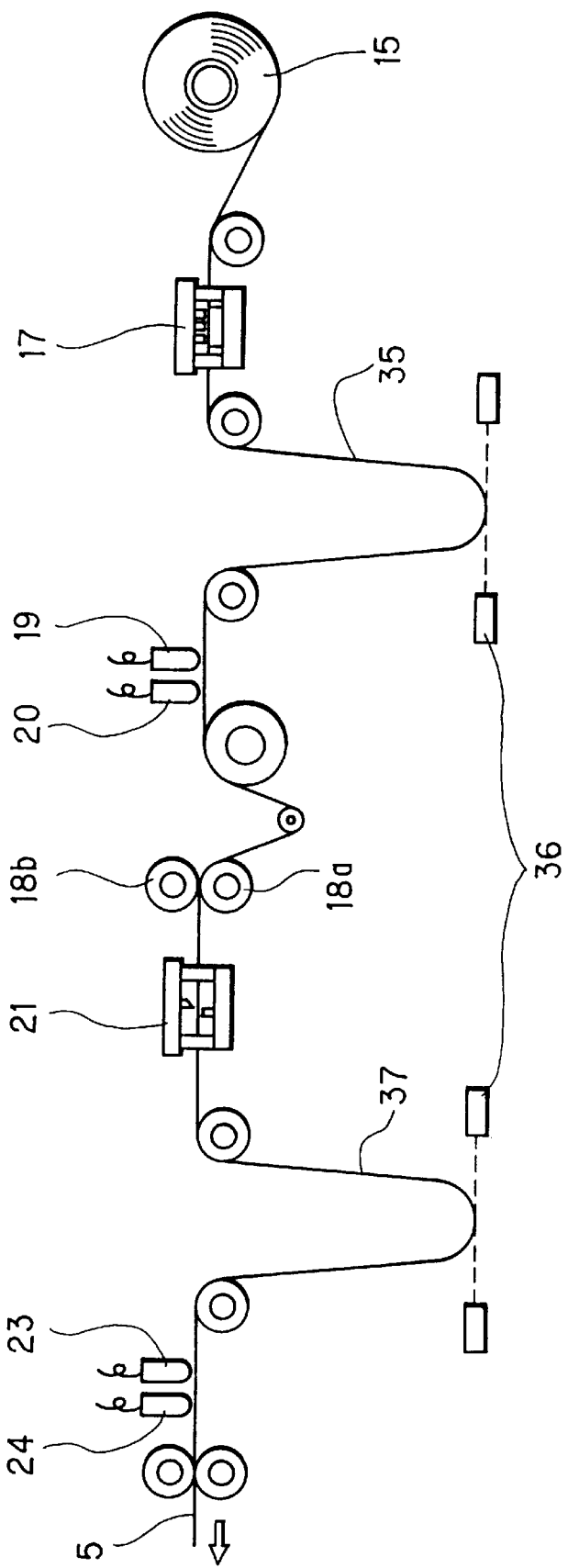
FIG. 5 is an explanatory view of a film manufacturing section of a cassette manufacturing apparatus according to another embodiment of the present invention.

In the above-described embodiments, the transport of the long film 15 stops when the perforations 13a and 13b are formed by the perforator 17, and is resumed while the film data is recorded by the recording head 19. In order to reliably maintain the length of the long film 15 between the perforator 17 and recording head 19 at a constant value, it is preferable to provide a buffer portion 35 for reserving a certain amount of a loop of the long film 15 between the perforator 17 and the recording head 19, as is shown in FIG. 5. In this embodiment, a loop sensor 36 is provided at a bottom portion of the loop to measure and control the amount of the loop contained in the buffer portion 35.

For example, the length of the long film 15 extending between the perforator 17 and the recording head 19 is M times longer than the interval of the image frame exposure areas 5c (M is an integer), such that one of the perforation 13a is located right in front of the recording head 19 at the moment when the long film 15 stops and the perforator 17 forms the perforation 13a. The recording head 19 starts recording a short time after the resume of transport of the filmstrip 15. As a result, the film data is recorded on the magnetic recording track 14a in association with each image frame exposure area 5c as shown in FIG. 2.

Also, a second buffer portion 37 can be provided between the cutter 21 and the second recording head 23, to store a loop of a predetermined amount of the individual filmstrip 5. For example, the length of the filmstrip 5 between the cutter 21 and the second recording head 23 is set to equal the predetermined total length of the filmstrip 5. Thereby, the trailing end 5e of the filmstrip 5 is located right in front of the second recording head 23 when the cutter 21 starts cutting of the leading end 5a of the same filmstrip 5 and the trailing end 5e of the following filmstrip 5 as well. Therefore, the magnetic recording track 13b is reliably recorded in the trailing end 5e, as illustrated in FIG. 3. Other portions of this embodiment can be similar to the embodiment shown in FIG. 4, and the filmstrip 5 thus manufactured may be assembled into the film cassette 2 in the cassette assembling section 30 as shown in FIG. 4. Therefore, a detailed description of these portions is omitted.

Figure 6:
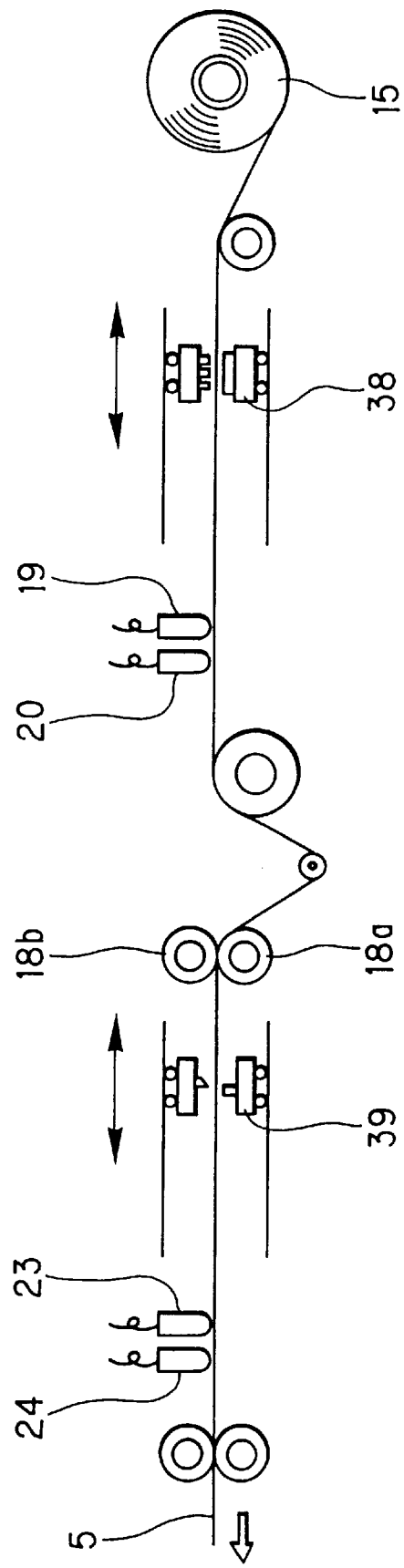
FIG. 6 is an explanatory view of a film manufacturing section of a cassette manufacturing apparatus according to yet another embodiment of the present invention.

FIG. 6 illustrates another embodiment of the present invention. In this embodiment, the long film 15 is transported to an oscillating perforator 38. The oscillating perforator 38 is driven synchronously with the film transport, and the magnetic recording head 19 is driven in synchronism with the oscillating perforator 38. The oscillating perforator 38 makes it unnecessary to stop transporting the long film 15 during forming the perforations 13a and 13b. Therefore, the oscillating perforator 38 can form the perforations 13a and 13b while the recording head 19 records the film data. However, in order to record the film data at regular intervals in predetermined positions, it is necessary to maintain the distance between the start perforating position of the oscillating perforator 38 and the recording head 19 in relation to the long film 15.

That is, the oscillating perforator 38 forms the perforations 13a and 13b while moving a constant distance back and forth in the film transporting direction, but the perforator 38 always starts perforating at the same position in the moving range thereof. Therefore, the distance between the start perforating positions of the oscillating perforator 38 and the recording head 19 is set, for example, M times longer than the interval of the image frame exposure areas 5c (M is an integer), such that one of the perforation 13a is located right in front of the recording head 19 at the moment when the oscillating perforator 38 starts perforating. The recording head 19 starts recording a short time later. As a result, the film data is recorded on the magnetic recording track 14a in association with each image frame exposure area 5c as shown in FIG. 2.

Also an oscillating cutter 39 is provided for cutting the long film 15 into the individual filmstrip 5 without the need for stopping the transport of the long film 15. The distance between the oscillating cutter 39 and the second recording head 23 should be maintained constant, to make the length of the filmstrip 5 constant. For example, the distance between the oscillating cutter 39 and the second recording head 23 is set to equal the predetermined length of the filmstrip 5. Thereby, the trailing end 5e of the filmstrip 5 is located right in front of the second recording head 23 when the oscillating cutter 39 starts cutting the leading end 5a of the same filmstrip 5 and the trailing end 5e of the following filmstrip 5. Therefore, the film data is recorded on the magnetic recording track 14b of the trailing end 5e, as shown in FIG. 3. Other portions of this embodiment can be similar to the embodiment shown in FIG. 4, and the filmstrip 5 thus manufactured may be assembled into the film cassette 2 in the cassette assembling section 30 as shown in FIG. 4. Therefore, further detailed description is omitted.

Although the magnetic recording layer is provided along both lateral sides of the long film 15 on the surface opposite to the photosensitive emulsion surface in the above described embodiment, it is possible to provide the magnetic recording layer along one lateral side or on the whole surface of the long film 15 opposite to the photosensitive emulsion surface. It is also possible to dispose a photo-sensor or the like in an upstream portion of each of the recording heads 19 and 23 to more precisely determine the recording position.

Although the filmstrip 5 is wound on the spool 4 and thereafter the spool 4 with the filmstrip 5 is loaded in the cassette shell 3 in the above described embodiment, it is of course possible to mount the spool 4 in the cassette shell 3 and thereafter secure the filmstrip 5 to the spool 4 and wind it into the cassette shell 3.

Figure 7:
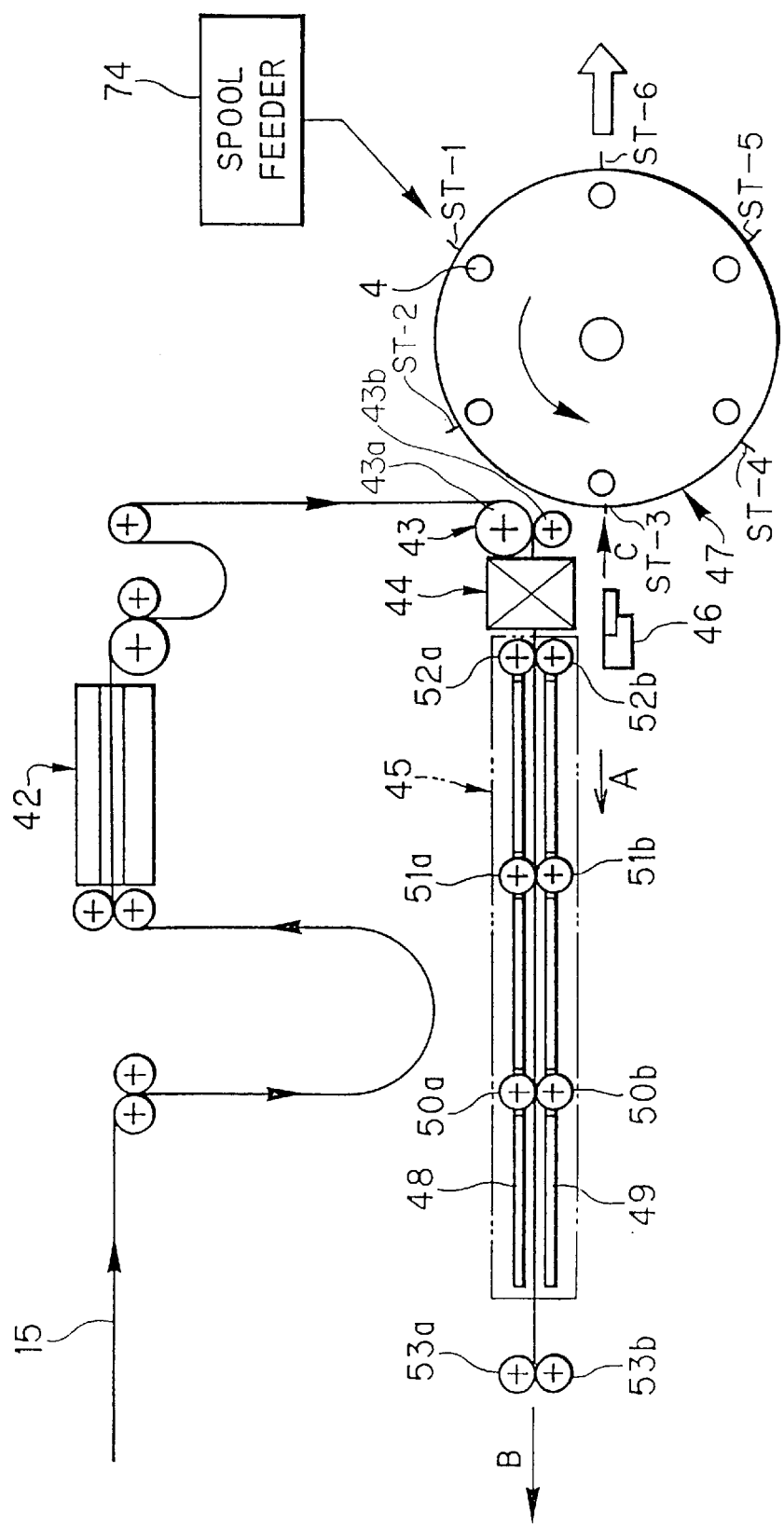
FIG. 7 is an explanatory view of a film cutting and winding section of a cassette manufacturing apparatus according to yet another embodiment of the present invention.
Figure 8:
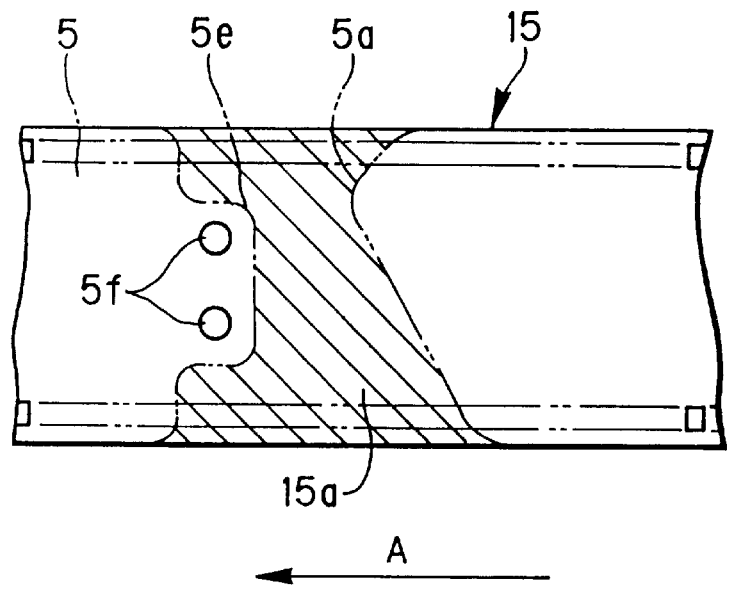
FIG. 8 is an explanatory view of a cut-out portion of a long strip of photographic film which is cut into individual filmstrips to be wound on a spool and loaded in a cassette shell.

FIG. 7 illustrates a film cutting and winding section of a cassette manufacturing apparatus according to another embodiment of the present invention. A long film 15 is drawn from a roll and transported longitudinally along a film transport path. A puncher 42, for punching a pair of holes 5f in the long film 15, as shown in FIG. 8, at regular intervals corresponding to the length of an individual filmstrip 5 to be wound about a spool 4, a measuring feeder 43, a cutter 44, and a shooter 45 are disposed along the transport path in order.

The pair of holes 5f are arranged side by side in the lateral direction of the long film 15. Thereafter, the cutter 44 cuts out a portion 15a from the long film 15 to form a trailing end 5e of the filmstrip 5 and a leading end 5a of the next filmstrip 5 in a manner as shown by chain-dotted lines in FIG. 8, in relation to the transporting direction A.

The measuring feeder 43 includes a pair of feed rollers 43a and 43b and stepwise transports the long film 15 by a given amount in the direction A, to insert a forward portion of the long film 15, that is, the portion corresponding to an unfinished one of the filmstrip 5, into the shooter 45. Thereby, a rearward portion of the long film 15 that is to be cut out as the portion 15*a* is positioned in the cutter 44. Upon determining the given amount of transport of the long film 15, the measuring feeder 43 stops the long film 15 for a short period of time and the cutter 44 cuts the long film 15.

The shooter 45 is constituted of upper and lower guide plates 48 and 49 disposed above and below the film transport path. The upper guide plate 48 is stationary and provided with rollers 50*a*, 51*a* and 52*a*. The lower guide plate 49 is provided with rollers 50*b*, 51*b* and 52*b* disposed in opposition to the rollers 50*a*, 51*a* and 52*a*, respectively. The lower guide plate 49 is movable between a closed position for nipping the long film 15 by the rollers 50*a*, 50*b*, 51*a*, 51*b*, 52*a* and 52*b*, and an open position for displacing the filmstrip 5 cut from the long film 15 downward from the film transport path. The rollers 50*a*, 50*b*, 51*a*, 51*b* and 52*a*, 52*b* are driven to rotate in the same way at the same speed as the feed rollers 43*a* and 43*b* to move the film in the direction A. If the filmstrip 5 nipped by the shooter 45 has any defects, the filmstrip 5 is ejected from the shooter 45 in a direction shown by an arrow B in FIG. 7 by means of the rollers 50*a*, 50*b*, 51*a*, 51*b*, 52*a* and 52*b*, and a pair of rollers 53*a* and 53*b* disposed downstream of the shooter 45.

Figure 9:
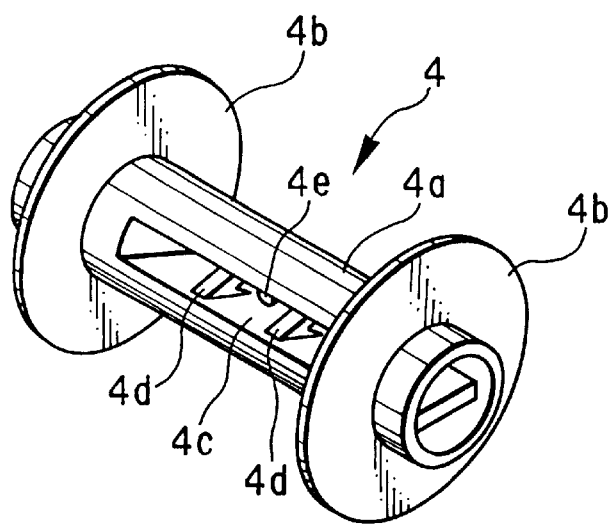
FIG. 9 is a perspective view of an example of the spool.

An inserter 46 is disposed in the vicinity of the cutter 44. The inserter 46 moves the filmstrip 5 cut from the long film 15 in a direction C, which is opposite to the direction A, and inserts the trailing end 5*e* of the filmstrip 5 into a slit 4*c* formed through a spool core 4*a* of the spool 4 between flanges 4*b*, as shown in FIG. 9, to secure the trailing end Se to the spool 4 through engagement between the holes 5*f* and claws 4*d* formed in the slit 4*c*. As shown in detail in FIG. 11, a rib 4*e* is also formed in the slit 4*c* to press the trailing end 5*e* at the portion between the holes 5*f* to prevent the claws 4*d* from slipping out of the holes 5*f*. After the trailing end 5*e* is secured to the spool 4, the spool 4 is rotated to wind the filmstrip 5 thereon by a drive mechanism of a winding unit 47, which is coupled to one end of the spool core 4*a*, as will be described in detail later.

It is to be noted that the long film 15 is subjected to a perforating process and other necessary processes, prior to the cutting and winding process shown in FIG. 7.

Figure 10:
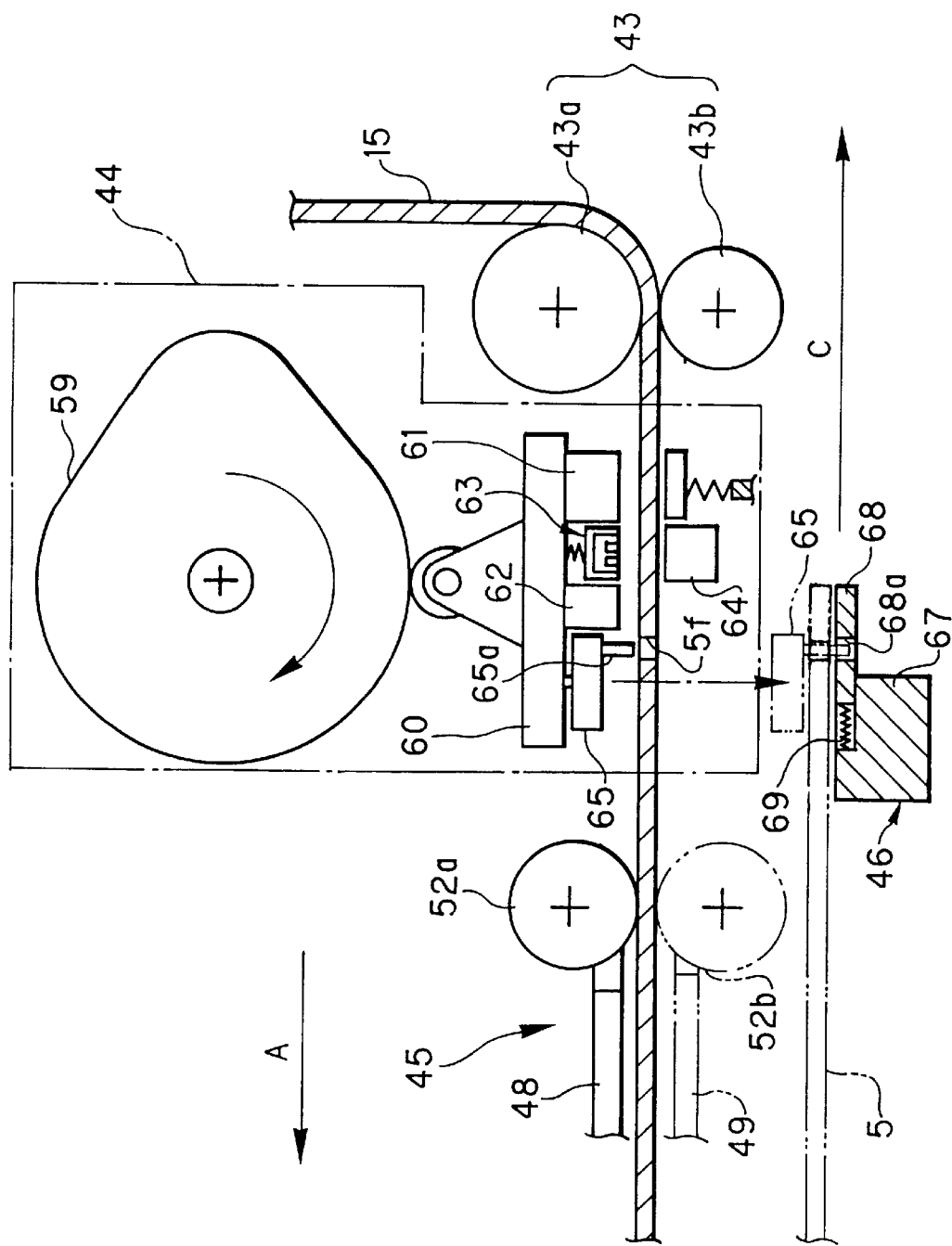
FIG. 10 is an explanatory view of a cutter and an inserter of the film cutting and winding section shown in FIG. 7.

FIG. 10 illustrates the cutter 44. A cam 59 makes one revolution to reciprocate a base plate 60 once in a vertical direction, that is, the direction perpendicular to the film transport path, to make one cutting stroke. The base plate 60 has cutting edges 61 and 62 spaced a predetermined distance apart from each other, and an ejection mechanism 63 disposed between these cutting edges 61 and 62 to hold and discard the cut portion 15*a* by vacuum suction force. A stationary cutting edge 64 is disposed in the opposite side of the film transport path from the cutting edges 61 and 62, in opposition to the space defined between these cutting edges 61 and 62.

The base plate 60 also has a transfer 65 mounted thereto. The transfer 65 is vertically movable relative to the base plate 60 between a position near the cutter 44 and a position near the inserter 46 placed in a stand-by position (see chain-dotted line). The transfer 65 has a vacuum suction mechanism incorporated therein for holding the top side of the long film 15 or the filmstrip 5. The transfer 65 also has a couple of pins 65*a* protruding downward to engage in the holes 5*f* and fix the position of the long film 15 during the cutting.

Figure 11:
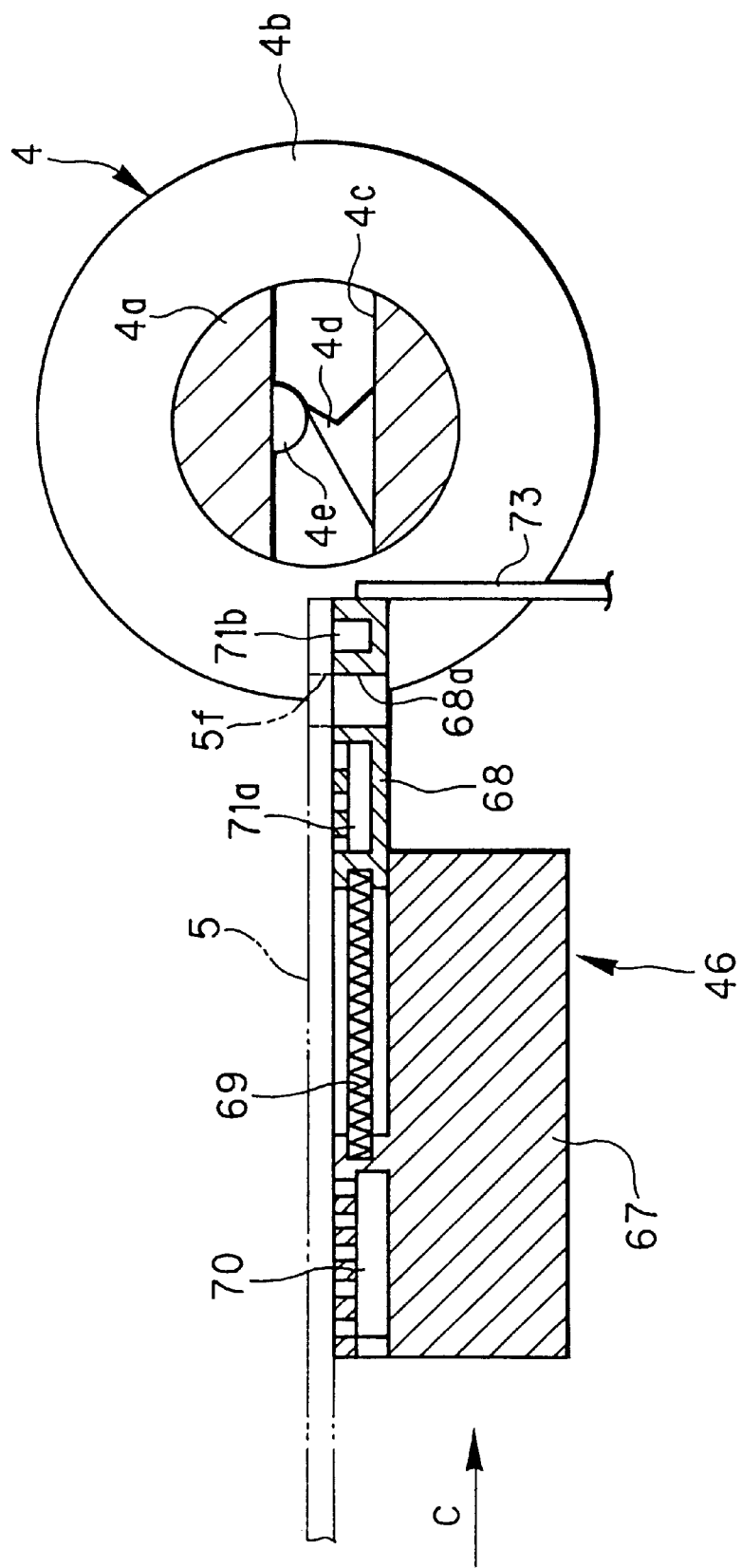
FIG. 11 is a sectional view of the inserter, showing a protruding position of a table of the inserter in relation to a spool.
Figure 12:
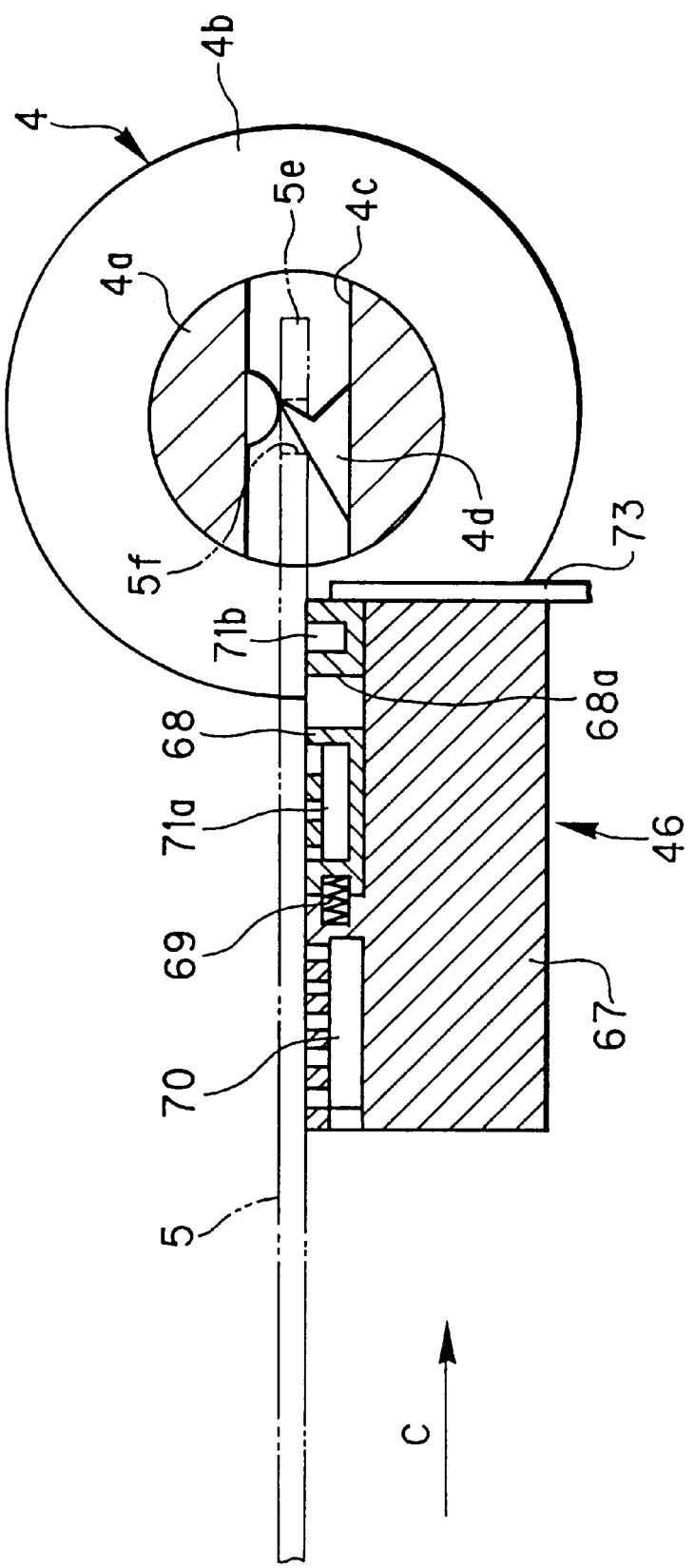
FIG. 12 is a section view of the inserter in a securing position wherein the table is in a retracted position and the trailing end of the filmstrip can be secured to the spool.

The inserter 46 is movable between the stand-by position shown in FIG. 10 and a securing position shown in FIG. 12. The moving direction C from the stand-by position to the securing position is reverse to the direction A. The inserter 46 is constituted of a base portion 67, a table 68, and a spring 69. The table 68 is slidable on the base portion 67 parallel to the direction A between a position protruding from the base portion in the direction C as shown in FIG. 11, and a retracted position shown in FIG. 12. The spring 69 urges the table 68 toward the protruding position. A hole 68*a* is formed in the table 68 for receiving the tip of the pin 65*a* when the transfer 65 moves down to the inserter 46. The base portion 67 and the table 68 contains vacuum suction mechanisms 70, 71*a* and 71*b* for holding the bottom side of the filmstrip 5. The power of the vacuum suction mechanism 71*a* and 71*b* of the table 68 is adjustable independently of the vacuum suction mechanism 70 of the base portion 67.

As the inserter 46 is moving into the securing position, the table 68 strikes against a stopper 73 of the winding unit 47, as shown in FIG. 11, and is thus pushed by the stopper 73 back to the retracted position as the inserter 46 moves further into the securing position, as shown in FIG. 12. While the table 68 is being pushed back, the power of the vacuum suction mechanism 71*a* and 71*b* is lowered, so that the trailing end 5*e*, having been held by the table 68, slips off the table 68 into the slit 4*c* of the spool 4 placed in the winding unit 47. The spool 4 is previously prepared and seriatim placed in the winding unit 47 by a spool feeder 74.

Figure 13:
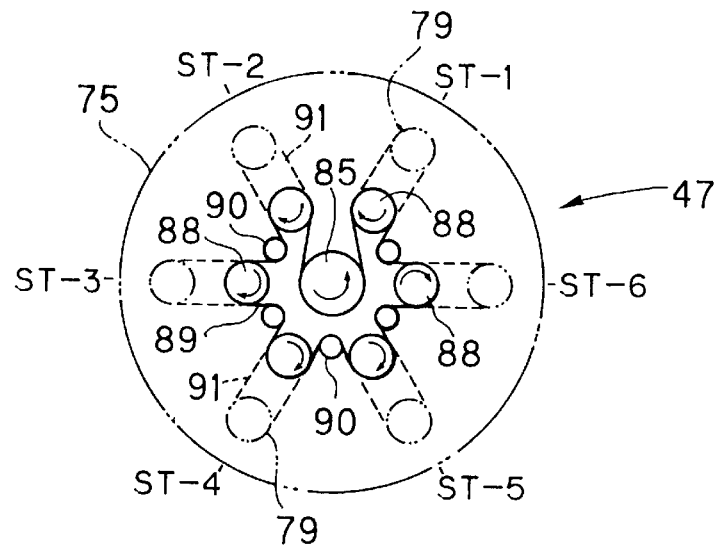
FIG. 13 is an explanatory view of a film winding unit of the film cutting and winding section of FIG. 7.
Figure 14:
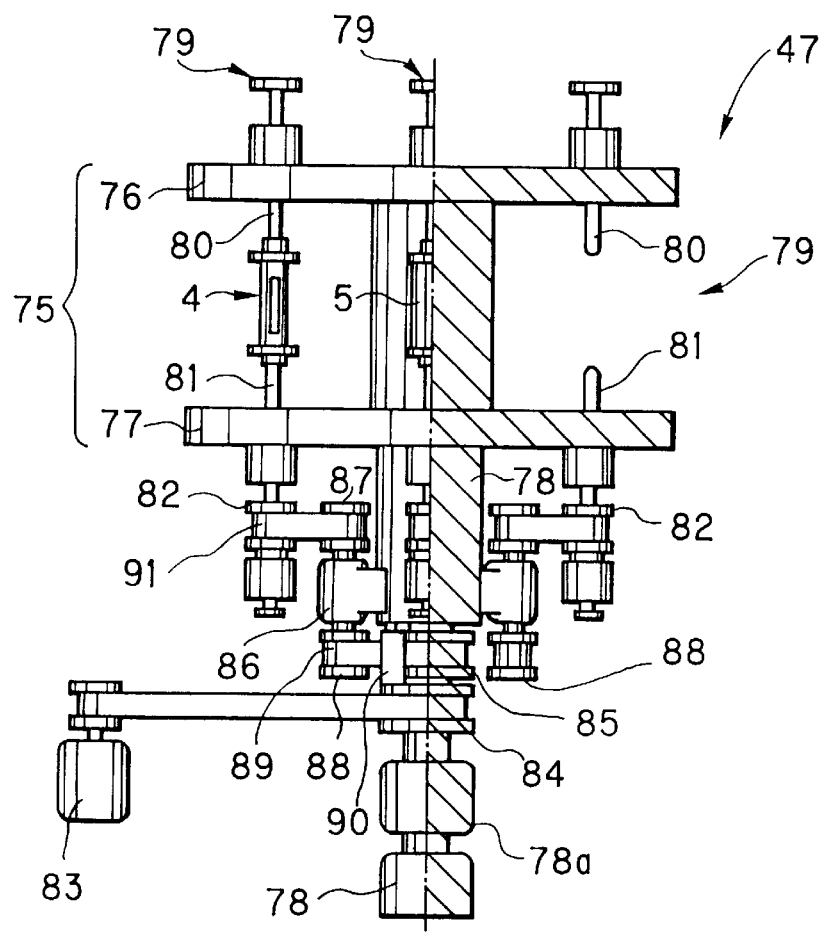
FIG. 14 is a side view of the film winding unit, partly in section.

FIGS. 13 and 14 illustrate an example of the winding unit 47. The winding unit 47 includes a holder 75 constructed of a pair of disks 76 and 77 which are spaced vertically from each other and rotated together by a holder motor, e.g., a step motor 78. A plurality of, for example six, chuck mechanisms 79 are mounted to the disks 76 and 77 and disposed at regular intervals around the rotational axis of the disks 76 and 77. A slip ring 78*a* is mounted on the rotary shaft of the step motor 78 to detect the rotational position of the holder 75.

Each chuck mechanism 79 has a pair of rotatable axles 80 and 81 which protrude inward from the disks 76 and 77 and are axially movable toward each other in a direction parallel to the rotational axis of the disks 76 and 77 to engage in the opposite ends of the spool core 4*a*. The spool 4 is thus rotatably chucked by the chuck mechanism 79. A pulley 82 is coupled to each axle 81 of the chuck mechanism 79.

A servo motor 83 is coupled to a pulley 84 which is rotatably mounted on the rotary shaft of the step motor 78. A pulley 85 is fixedly coupled to the pulley 84. The holder 75 has a sleeve 78 fixedly mounted thereto and extending in coaxial with the rotational axis of the holder 75, and six clutch brakes 86 are mounted on the periphery of the sleeve 78 on the opposite side from the chuck mechanisms 79. A pulley 87 is fixedly coupled to an output shaft of each clutch brake 86, and a pulley 88 is fixedly coupled to an input shaft of each clutch brake 86. The six pulleys 88 are coupled to the pulley 85 through a timing belt 89 which is turned about the pulleys 85 and 88 in a manner as shown by solid line in FIG. 13, by way of five press roller 90. The press rollers 90 are secured to the sleeve 78.

On the other hand, the six pulleys 87 on the input shafts of the clutch brakes 86 are each coupled to the pulleys 82 in one-to-one relation through a timing belt 91. In this way, the respective axles 81 of the chuck mechanisms 79 are driven by the single servo motor 83 while being individually rotated and stopped under the control of the associated clutch brakes 86.

The holder 75 is rotated stepwise and pauses six times at regular intervals during one revolution. At the six stop positions of the chuck mechanisms 79, chucking of the spool 4 and orientation of the spool 4 are sequentially performed. Therefore, the stop positions are referred to as work stations ST-1 to ST-6. At the work station ST-1, the spool 4, fed by the spool feeder 74, is chucked by one of the chuck mechanisms 79. At the work station ST-2, the slit 4c of the chucked spool 4 is oriented appropriately. At the work station ST-3, the filmstrip 5 is secured to the spool 4 by the inserter 46 in the above-described manner. Winding of the secured filmstrip 5 is performed at the work stations ST-4 and ST-5, and the spool 4 with the filmstrip 5 wound thereon is outputted from the winding unit 47 at the work station ST-6. Thereafter, the spool 4 with the filmstrip 5 is inserted inside a pair of shell halves constituting a cassette shell, and the shell halves are secured to each other, for example, by ultrasonic welding, thereby completing a photographic film cassette.

Figure 15:
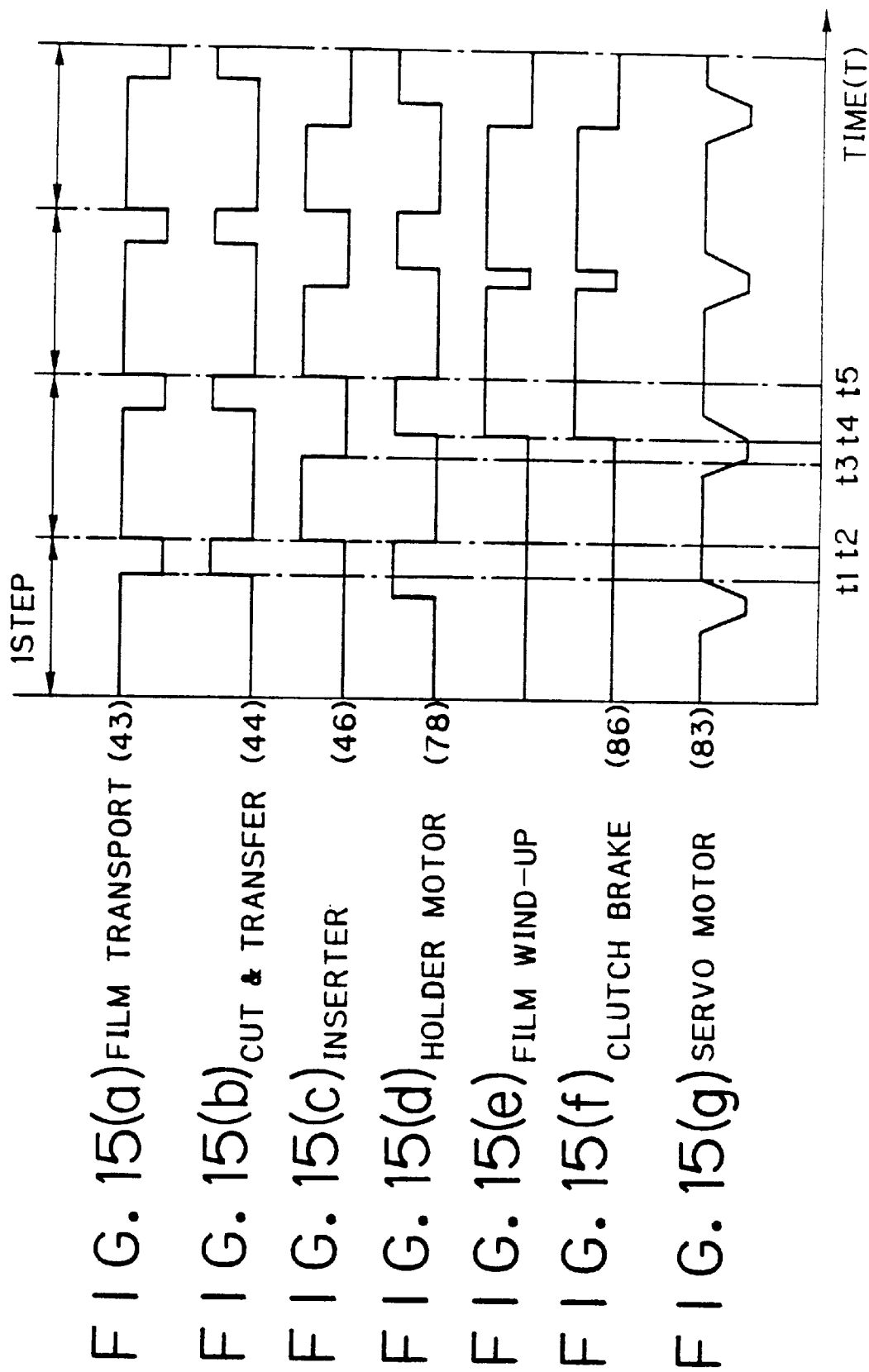
FIG. 15 are timing charts illustrating the operation of the film cutting and winding section of FIG. 7.

The operation of the above-mentioned embodiment will now be described with reference to the timing charts of FIG. 15.

The measuring feeder 43 stops transporting the long film 15 at time t1. Simultaneously, the cutter 14 cuts the long film 15 and, immediately before or after the cutting, the transfer 65 holds the trailing end 5e of the filmstrip 5 just cut from the long film 15. Thereafter, the lower guide plate 49 of the shooter 45 is moved into the open position, and the transfer 65 transfers the filmstrip 5 to the inserter 46 placed in the stand-by position. This transferring operation is completed at time t2. At the same time t2, the holder 75 stops rotating to position the spool 4 at the work station ST-3. Then, the inserter 46 holds the trailing end 5e of the filmstrip 5 by the vacuum suction force, whereas the transfer 65 releases the filmstrip 5 from the vacuum suction force thereof.

The inserter 46 moves the filmstrip 5 in the direction C, which is reverse to the transporting direction A of the measuring feeder 43. When the inserter 46 reaches the securing position, the trailing end 5e of the film 5 is secured to the spool 4 placed in the work station ST-3. This securing operation is completed at time t3. At that time t3, the holder 75 is still stationary.

The holder 75 starts rotating again from time t4, and stops again at time t5. At that time t5, the spool 4, having the filmstrip 5 secured thereto, arrives at the work station ST-4. Simultaneously with the start of rotation of the holder 75 at the time t4, one of the clutch brakes 86, that corresponds to the chuck mechanism 79 is positioned in the work station ST-3 from the time t2 to t4, is activated. As a result, the servo motor 83 is connected to the axle 81 of this chuck mechanism 79 to start winding of the filmstrip 5. The winding is conducted with one break or pause while the corresponding spool 4 is carried from the work station ST-3 to the work station ST-5.

It is, of course, possible to start winding from the time t5 when the corresponding spool 4 arrives at the work station ST-4, and continue winding until the corresponding spool arrives at the work station ST-6.

Figure 16:
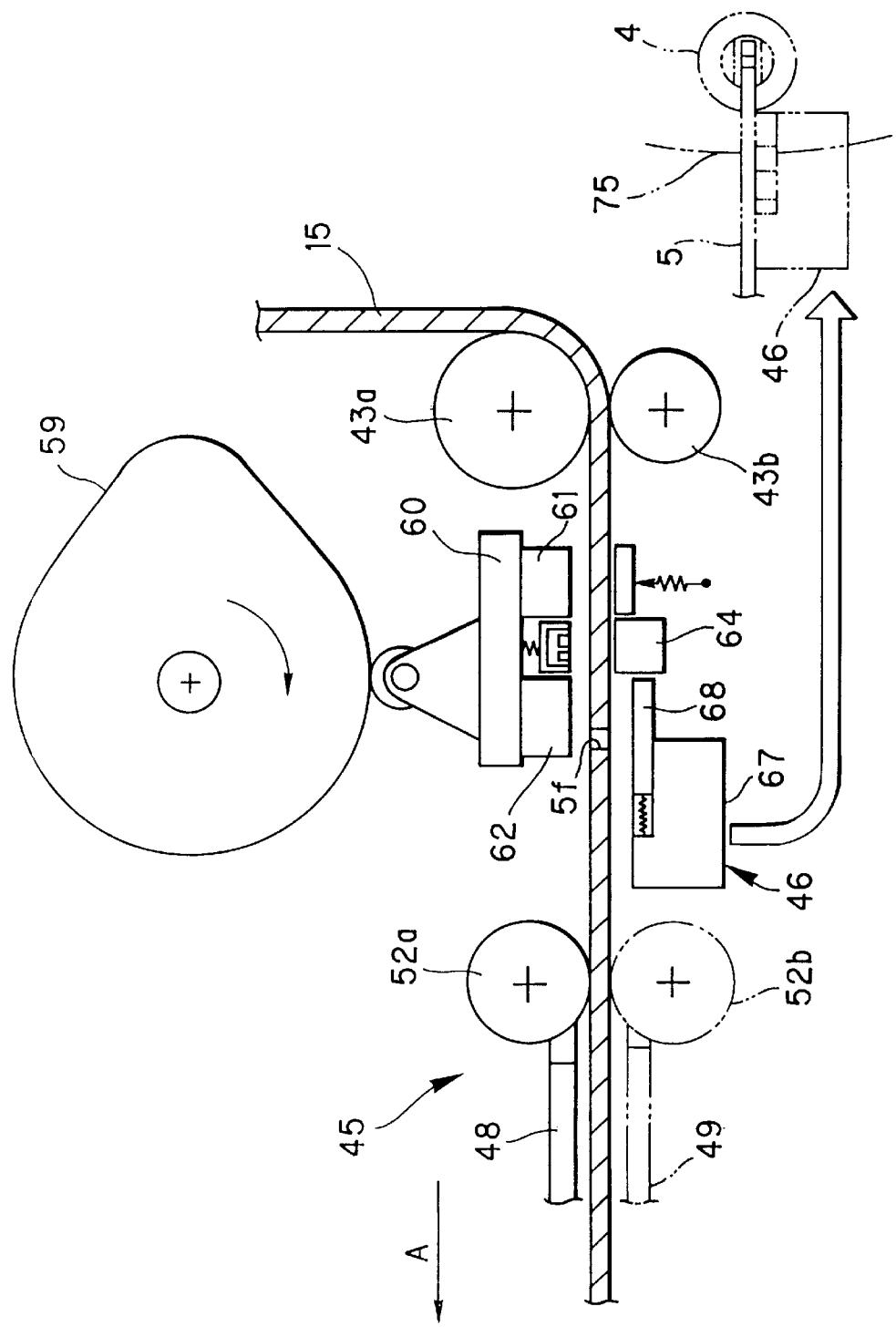
FIG. 16 is an explanatory view of another embodiment of the cutter and the inserter of the film cutting and winding section of FIG. 7.

FIG. 16 shows another embodiment wherein the transfer 65 is omitted. Instead, an inserter 46 holds the trailing end 5e of the filmstrip 5 immediately before or after the cutting thereof. Thereafter when a shooter 45 moves in the open position, the inserter 46 displaces the filmstrip 5 downward from the film transport path and then moves the filmstrip 5 in the direction C until the filmstrip 5 is secured to the spool 4.

Figure 17:
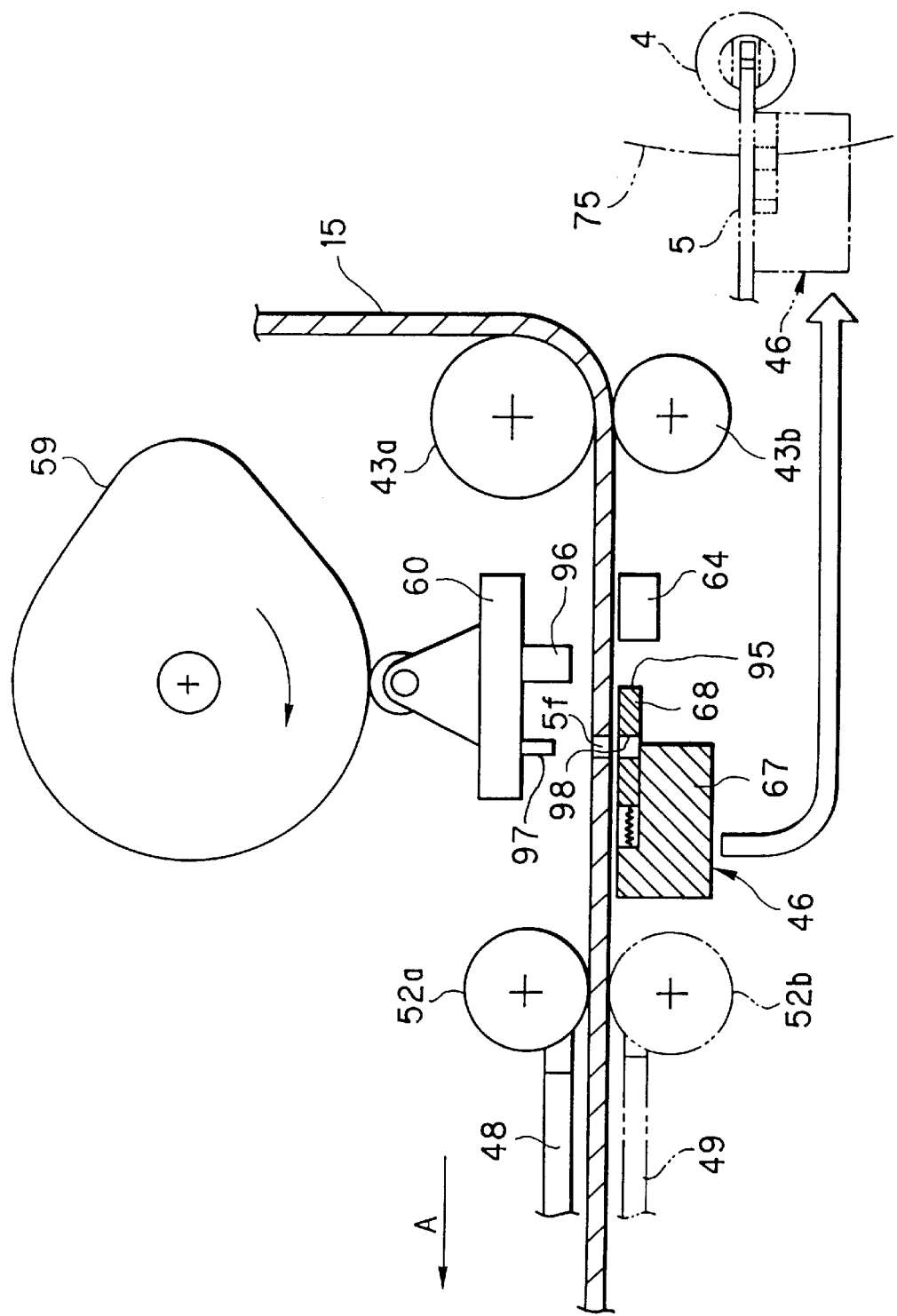
FIG. 17 is an explanatory view of another embodiment of the cutter and the inserter of the film cutting and winding section of FIG. 7.

It is also possible to provide a cutting edge 95 on a table 68 of an inserter 46 as shown in FIG. 17. In this embodiment, a stationary cutting die 64 is spaced apart from the cutting edge 95 in correspondence with the cutout portion 15a of the long film 15 as shown in FIG. 8, when the inserter 46 is in the stand-by position. A movable cutting die 96 is mounted on a base plate 60 and opposed to the spacing between the cutting die 64 and the cutting edge 95, to cut out the portion 15a from the long film 15 by means of these cutting members 64, 95 and 96.

Furthermore, in the embodiment shown in FIG. 17, in order to punch the holes 5f simultaneously with the cutting of the long film 15, a pair of punching pins 97 are mounted on the base plate 60, and corresponding holes having cutting edges 98 are formed in the table 68 of the inserter 46.

Although the embodiments shown in FIGS. 7 to 17 have been described with respect to a cassette manufacturing method wherein a filmstrip is wound on a spool before the spool is loaded in a cassette shell, these embodiments are also applicable to such a cassette manufacturing method wherein a spool is previously mounted in a cassette shell, and thereafter a filmstrip is secured to the spool and wound into the s cassette shell.

Figure 18:
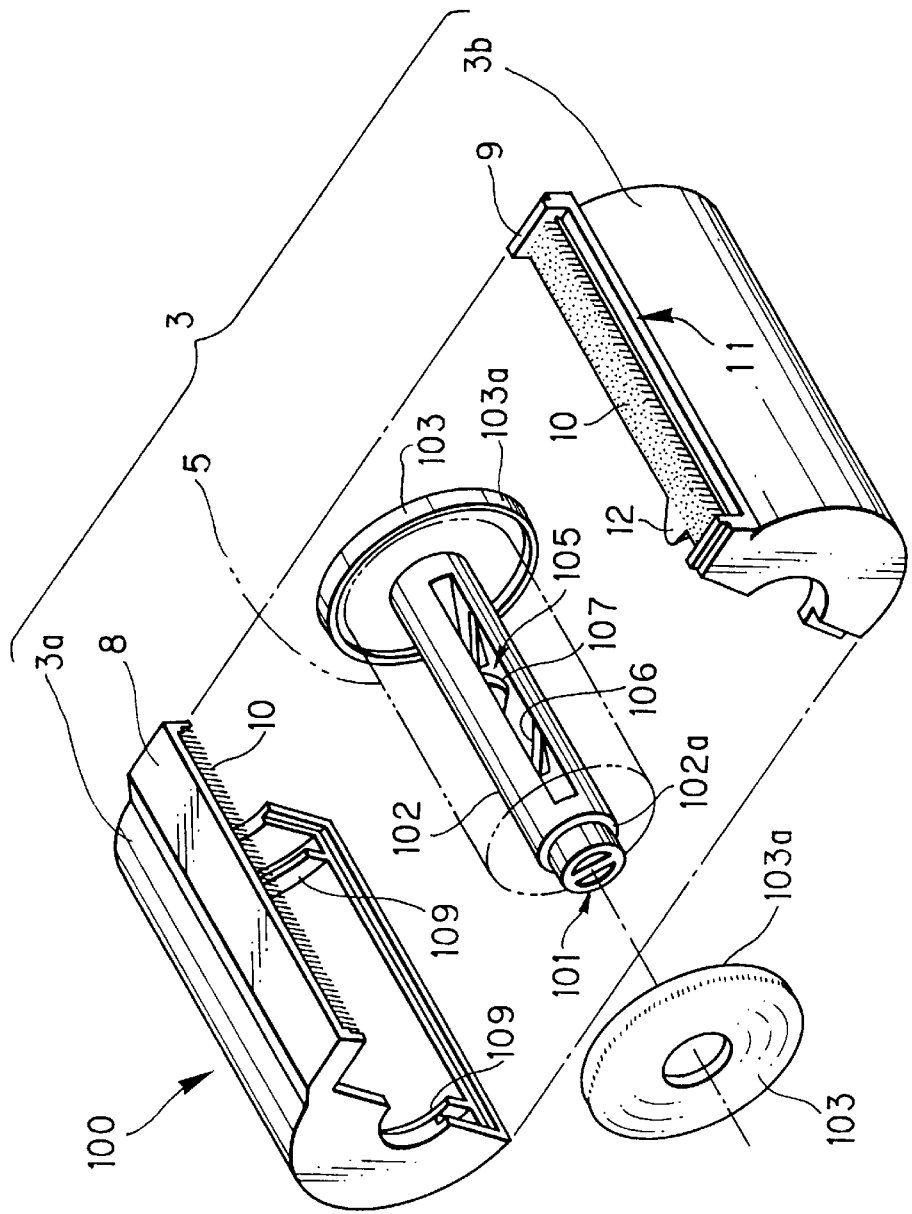
FIG. 18 is an exploded perspective view of a photographic film cassette having a different construction from that shown in FIG. 1.

FIG. 18 shows a photographic film cassette 100 having the substantially same construction as the photographic film cassette 2 shown in FIG. 1, except a spool 101 has elastic flanges 103 made separately of resin material and fitted to the opposite ends of the spool core 102. The axial position of the flanges 103 on the spool core 102 is confined by a pair of ridges 109 formed on the inner periphery of a cassette shell 3 when the spool 101 is mounted in the cassette shell 3. The ridges 109 press the flanges 103 at circumferential portions thereof against lateral sides of a roll of filmstrip 5 wound on the spool core 102.

Each flange 103 has a rim 103a curved to protrude inwardly in the axial direction of the cassette 100 when fitted on the spool core 102, to contact an outermost convolution of the film roll 5 at a lateral portion thereof and radially confine the outermost convolution. Thereby, loosening of the film roll 5 is prevented, and the film roll 5 is rotated together with the spool 101 when the spool 101 is rotated in an unwinding direction, that is, a clockwise direction in FIG. 18. As a result, when the spool 101 is rotated, a leading end of the filmstrip 5 is peeled off the next inward convolution by a separating claw 12 and thus advanced to the outside of the cassette shell 3 through a film passage mouth 11 which is formed between port portions 8 and 9 of upper and lower shell halves 3a and 3b constituting the cassette shell 3. Light-trapping members 10 are cemented to the inner wall of the port portions 8 and 9.

The spool core 102 has annular shoulders 102a formed on opposite end portions thereof to stop the flanges 103 from moving too far inwardly on the spool core 102. A slit 105 for receiving a trailing end of the filmstrip 5 is formed in the spool core 102, and a pair of claws 106 and a pressing rib 107 are formed in the slit 102 to secure the trailing end to the spool 101 through engagement between the claws 106 and holes formed in the trailing end, in the same way as the above-described embodiments.

Because the flanges 103 are elastic and separate parts, the position of the flanges 103 on the spool core 102 is unstable unless the flanges are properly pressed by the ridges 109. Therefore, when manufacturing such a photographic film cassette as shown in FIG. 18, it is desirable to properly mount a spool with flanges in a cassette shell and thereafter wind a filmstrip into the cassette shell by securing the filmstrip to the spool and then rotating the spool in a winding direction. FIGS. 19 to 22 illustrate a cassette manufacturing apparatus according to an embodiment of the present invention for manufacturing the film cassette 100 shown in FIG. 18.

Figure 19:
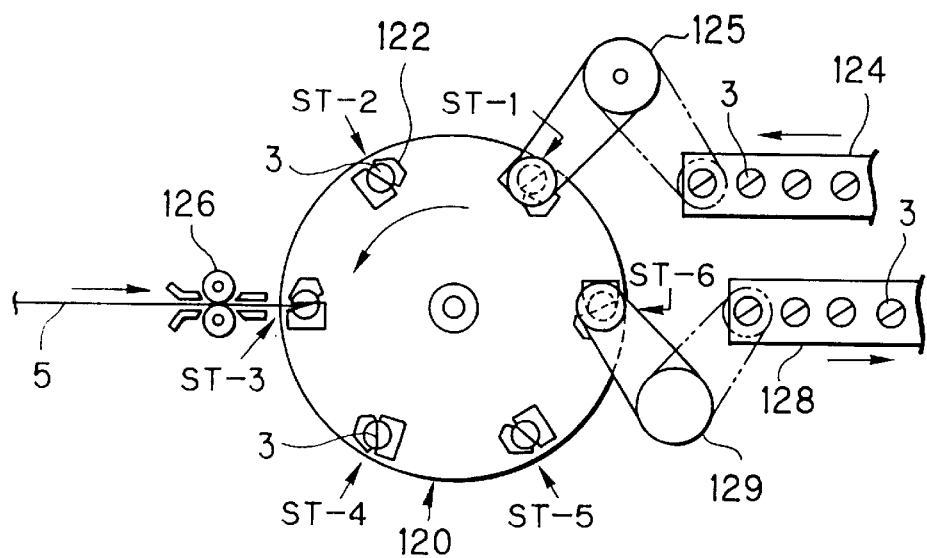
FIG. 19 is an explanatory view of a film winding section of a cassette manufacturing apparatus according to another embodiment of the present invention, which is suitable for manufacturing the photographic film cassette as shown in FIG. 18.

Referring to FIG. 19 illustrating a film winding section of the cassette manufacturing apparatus, a rotational disk or table 120 has a plurality of, for example, six nests 122 each holding a cassette shell 3 containing the spool 101 therein. The nests 122 are disposed at regular intervals around the rotational axis of the table 120, and sequentially stopped at six work stations ST-1 to ST-6 disposed around the table 120 at intervals corresponding to the nests 122.

A feeding conveyer 124 and a robot arm 125 are disposed in the work station ST-1. The feeding conveyer 124 successively feeds the cassette shells 3 containing the spool 101 to the work station ST-1, and the robot arm 125 seriatim transfers the cassette shell 3 from the conveyer 124 to the nest 122 stopping at the work station ST-1. A pair of insert rollers 126 and a film guide 127 are movably disposed in the work station ST-3, as shown in detail in FIG. 21, wherein the cassette shell 3 is opened by the nest 122, and the film guide 127 is inserted into the opened cassette shell 3 so as to insert the trailing end 5e of the filmstrip 5 into the slit 105 of the spool 101 contained in the cassette shell 3.

Thereafter, the spool 101 is rotated to wind the filmstrip 5 entirely into the cassette shell 3. An output conveyer 128 and a robot arm 129 are disposed in the work station ST-6 wherein the robot arm 129 grasps and transfers the cassette shell 3 containing the filmstrip 5 therein onto the output conveyer 128. Then, the output conveyer 128 sends the cassette shell 3 to the following process wherein the shell halves 3a and 3b are secured to each other by welding.

Figure 20:
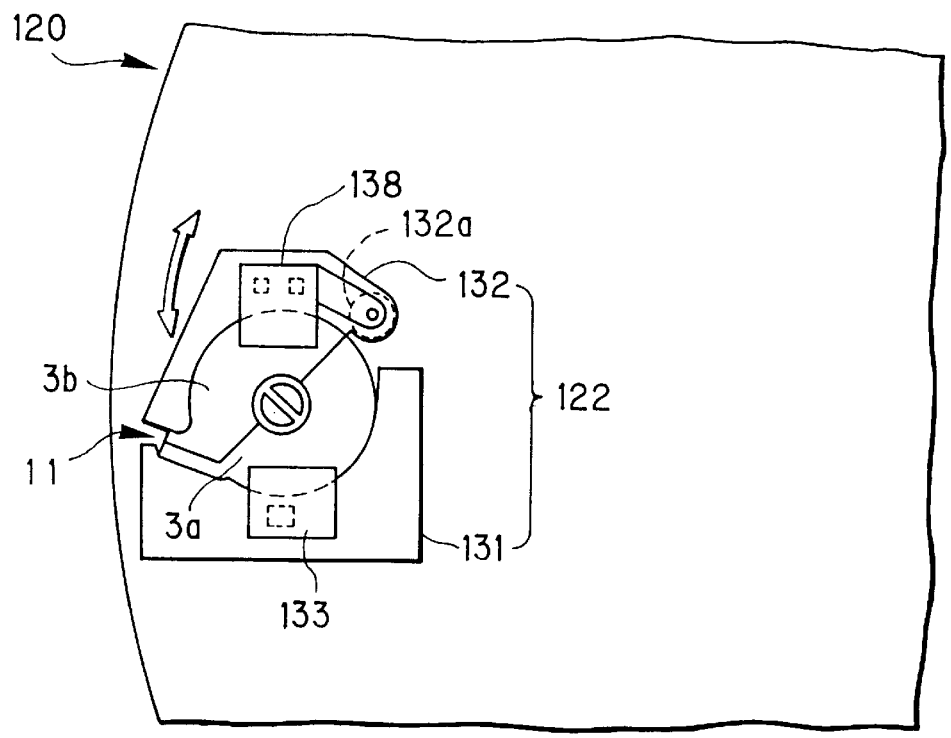
FIG. 20 is a top plane view of a nest of the film winding section of FIG. 19, holding a cassette shell therein.
Figure 22:
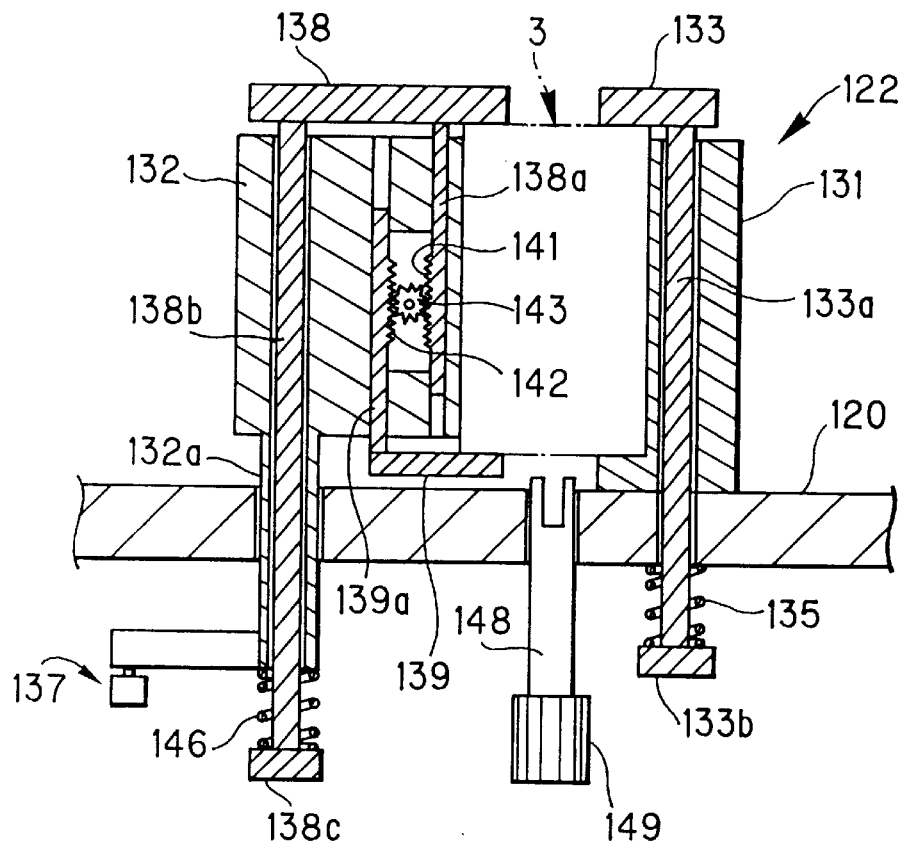
FIG. 22 is a vertical sectional view of the nest shown in FIG. 21.

Each nest 122 is comprised of a pair of holders 131 and 132 which are shaped to conform to the outer curves of the upper and lower shell halves 3a and 3b, respectively, as shown in FIGS. 20 and 22. The first holder 131, for holding the upper shell half 3a, is fixedly mounted on the top of the table 120, and a clamp 133 is attached to the first holder 131 through a shaft 133a to be movable up and down relative to the first holder 131. The shaft 133a extends vertically through the first holder 131 to project under the table 120. A spring 135 is mounted between a lower end 133b of the shaft 133a and the bottom surface of the table 120, so as to urge the clamp 133 to move downward to the table 120. Thereby, the upper shell half 3a is clamped axially between the clamp 133 and a base surface 131a of the first holder 131.

The second holder 132 is mounted to the table 120 through a hollow shaft 132a to be pivotally and axially movable about the hollow shaft 132a relative to the table 120. The hollow shaft 132a is coupled to a not-shown control mechanism for controlling the pivotal and axial movement of the second holder 132 through a lever 137 secured to the hollow shaft 132a. Top and bottom clamps 138 and 139 for axially clamping the lower shell half 3b are attached to the second holder 132 through shafts 138a, 138b and 139a to be movable up and down relative to each other as well as to the second holder 132.

The first shaft 138a of the top clamp 138 and the shaft 139a of the bottom clamp 139 have rack gears 141 and 142 formed thereon, respectively. The rack gears 141 and 142 are coupled to each other through a pinion 143, such that the clamps 138 and 139 are moved in cooperation with each other in the opposite vertical directions to each other. The second shaft 138b of the top clamp 138 extends coaxially through the hollow shaft 132a of the second holder 132, and the lower end 138c of the second shaft 138b projects under the table 120 beyond the lower end of the hollow shaft 132a. A spring 146 is mounted between the lower end 138b of the second shaft 138a and the lower end of the hollow shaft 132a so as to urge the top clamp 138 to move is downward to the table 120.

Furthermore, a fork shaft 148 is rotatably mounted to the table 120 in a center position between the first and second holders 131 and 132. The fork shaft 148 is also movable in an axial direction so as to engage into one end of the spool core 102 of the spool 101 mounted between the shell halves 3a and 3b. A gear 149 is fixedly mounted on the lower end of the fork shaft 148. The fork shaft 148 is rotated by a not-shown drive mechanism through the gear 149.

Figure 21:
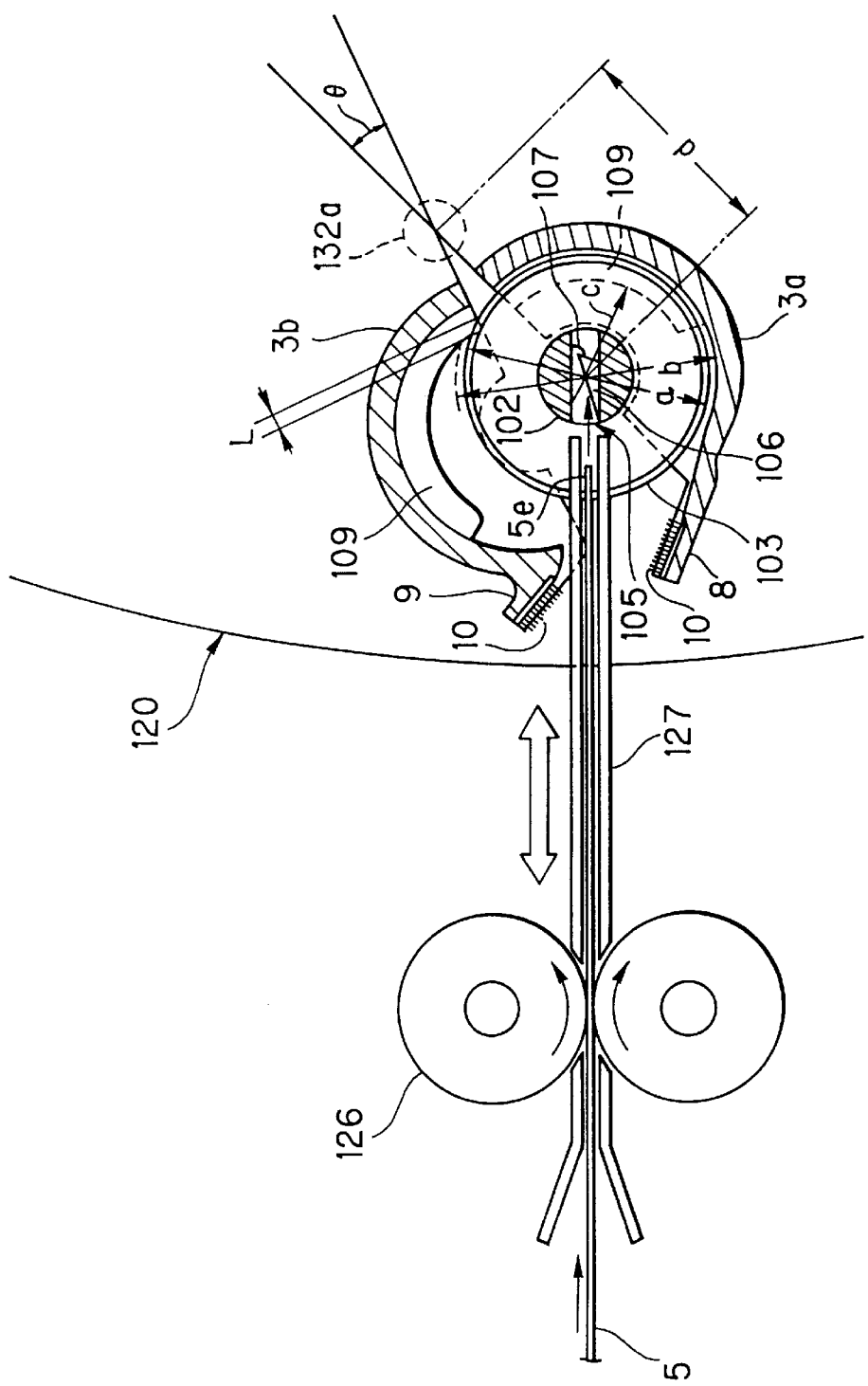
FIG. 21 is an explanatory view of film inserting and securing operation in the film winding section of FIG. 19.
Figure 23:
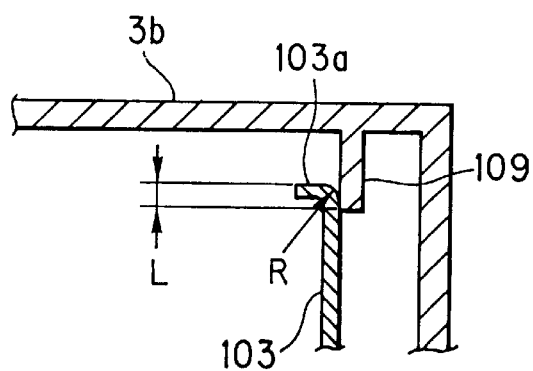
FIG. 23 is a partial sectional view showing a relationship between a ridge of a lower shell half and a flange of a spool in an opened position of the cassette shell as shown in FIG. 21.

As shown in FIG. 21, at the work station ST-3, the second holder 132 pivots to rotate at an angle θ about the shaft 132a to separate the lower shell half 3b from the upper shell half 3a to widen the film passage mouth 11. At that time, the flanges 103 are in contact with the ridges 109 of the lower shell half 3b by an amount L (see also FIG. 23). If the amount L is too small, the flanges 103 can be damaged by the ridges 109 or can be wrongly located relative to the ridge 109 when the lower shell half 3b is reset to the initial position to be mated with the upper shell half 3a. The suitable amount L varies depending upon the conditions of the ridges 109 and the flanges 103, such as the curve of rounded edges, stiffness, smoothness of the surface, and so forth.

According to the present embodiment, the amount L is experimentally determined to be not less than 0.3 mm under the following conditions: the external diameter a of the flanges 103 is 21.2 mm, the internal diameter b of the cassette shell 3 is 22 mm, the radial distance c from the rotational axis of the spool 101 to the inner end of the ridges 109 is 8 mm, the radial distance d from the pivotal center of the shaft 132a to the axial center of the spool 101 is 14 mm, and the radius of curvature R of the rim 103a of the flanges 103 (see FIG. 23) is 0.2 mm.

An experiment was performed by opening and closing the cassette shell while varying the amount L from 0.1 mm to 0.6 mm by an increment of 0.1 mm. The cassette shell 3 was opened and closed 20 times for each increment. The results of the experiment is shown in Table 1.

TABLE 1

| L (mm)  | 0.1 | 0.2 | 0.3 | 0.4 | 0.5 | 0.6 |
|---------|-----|-----|-----|-----|-----|-----|
| TROUBLE | C   | B   | A   | A   | A   | A   |

In Table 1, "A" means no problems occurred, "B" means problems occurred less than four times per the 20 times open-and close operations, and "C" means is problems occurred 4 times or more. Therefore, it is clear that the amount L should be 0.3 mm or more for the cassette as defined above in order to achieve desirable operation.

The operation of the embodiment shown in FIGS. 19 to 23 will now be described.

First, the light-trapping members 10 are cemented to the inner walls of the port portions 8 and 9 of the upper and lower shell halves 3a and 3b, for example, by means of heat-melting adhesive. Thereafter, the shell halves 3a and 3b are sent to a temporary assembling process (not-shown) wherein the shell halves 3a and 3b are mated together after insertion of the spool 101 therebetween. The above process can be performed in a lighted environment. Therefore, the elastic flanges 103 can be unfailingly and easily positioned inside the ridges 109 in the cassette shell 3.

Next, the cassette shell 3, containing the spool 101 therein, is conveyed by the feed conveyor 124 to the work station ST-1 of the table 120 which is disposed in a dark room. At the work station ST-1, the second holder 132 of the nest 122 is in an open position displaced pivotally away from the first holder 131. The clamps 138 and 139 are in a release position removed away from each other, and the clamp 133 of the first holder 131 is pushed upward, for example, by an oil hydraulic cylinder to provide a sufficient space enough to receive the cassette shell 3. Therefore, the robot arm 125 sets the cassette shell 3 between the holders 131 and 132 from the top side of the nest 122. Thereafter, the second holder 132 is moved in a close position shown in FIG. 20, and clamps 133, 138 and 139 are moved to clamp the cassette shell 3.

The table 120 rotates to move the clamped cassette shell 3 from the work station ST-1 to the work station ST-2. At the work station ST-2, the fork 48 engages into the spool core 102 and rotates the spool 101 to direct an inlet of the slit 105, that is, the left hand side of the slit 105 in FIG. 21, to the outside of the table 120. While the table 120 is rotating to move the cassette shell 3 from the work station ST-2 to the work station ST-3, the second holder 132 pivots at the angle θ to separate the shell halves 3a and 3b from each other to such an extent that the insertion of the film guide 127 into the cassette shell 3 is permitted while the ridges 109 of the lower shell half 3b are still in contact with the flanges 103 by the amount L. Needless to say, the ridges 109 formed in the upper shell half 3a stay in contact with the flanges 103.

At the work station ST-3, the insertion rollers 126 and the film guide 127 are moved together to a film loading position shown in FIG. 21, wherein a forward end of the film guide 127 is inserted between the port portions 8 and 9, that is, the widened film passage mouth 11 into a position close to and opposing to the inlet of the slit 105. Thereafter, the insertion rollers 26 are rotated, so that the filmstrip 5, which is previously provided with perforations and cut into a predetermined length, is transported toward the slit 105 through the film guide 127. When the trailing end 5e of the filmstrip 5 is thus inserted into the slit 105, the claws 106 and the pressing rib 107 secures the filmstrip 5 to the spool 101. Then, the rollers 126 and the film guide 127 are moved back to a retracted position to avoid interference with the rotation of the table 120.

While the table 120 is rotating to move the cassette shell 3 from the work station ST-3 to the work station ST-4, the second holder 132 pivots back to the closed position to mate the shell halves 3a and 3b together again. By virtue of the continued contact of the ridges 109 with the flanges 103, the flanges 103 are smoothly and properly positioned inside the ridges 109.

When the cassette shell 3 arrives at the work station ST-4, the fork 148 is driven to rotate the spool 101 to wind the filmstrip 5 about the spool 101. Thereby, the filmstrip 5 is drawn into the cassette shell 3 through the film passage mouth 11 until the filmstrip 5 has been entirely located inside the cassette shell 3. For example, the drive of the fork 148 may be stopped upon a sensor detecting a predetermined tension level of the filmstrip 5.

The table 120 further rotates to move the cassette shell 3 containing the filmstrip 5 from the work station ST-4 to the work station ST-6. In this embodiment, the work station ST-5 is merely a stop position wherein no process is executed. At the work station ST-6, the robot arm 129 transfers the cassette shell 3 from the nest 122 to the output conveyer 128 to convey the cassette shell 3 to the next welding process. The emptied nest 122 is moved to the work station ST-1 and supplied with another cassette shell 3 having no film therein. Thus, the process above is repeated.

Although the above described embodiments relate to methods and apparatuses for manufacturing photographic film cassettes of leader advancing type, it is also possible to apply the invention to manufacturing of other types of photographic film cassettes. Also the spool may have a single claw in the slit, or may have another film securing mechanism.

Control and timing of the invention can be accomplished with known devices. For example, a microprocessor based controller can be appropriately programmed and coupled to known sensors and drive devices such as motors and solenoids, of course, hard-wired control systems can also utilized.

While the present invention has been described in detail above with reference to a preferred embodiments shown in the drawings, it will be apparent to those skilled in the art that various changes and modifications of the present invention are possible without departing from the scope of the invention as defined by the appended claims.

What is claimed is:

1. A method of manufacturing a photographic film cassette, said method comprising the steps of:

providing a pair of shell halves which comprise a cassette shell, each of said pair of shell halves of said cassette shell having confining elements formed on an inner periphery of said cassette shell, and a film passage mouth formed between said shell halves providing a spool which is rotatably mounted in said cassette shell providing a pair of flexible flanges and mounting said pair of flexible flanges on opposite ends of said spool;

inserting said spool inside said shell halves in a lighted environment with said flanges mounted to said spool so that said confining members press said flanges at circumferential portions thereof;

mating said shell halves together to form said cassette shell;

separating said shell halves in an unlighted environment to widen said film passage mouth to an extent that said confining elements still press said flanges at said circumferential portions thereof;

providing a length of photographic film having a trailing end and a leading end, and inserting said trailing end of a strip of said photographic film through said widened film passage mouth toward said spool;

securing said trailing end of said photographic film to said spool;

subsequently mating said shell halves together again;

winding said photographic film into said cassette shell by rotating said spool in a winding direction so that a roll of photographic film is tightly wound on said spool; and pressing said flexible flanges, using said confining members against planar end surfaces of said photographic film roll, such that said flexible flanges deform while pressing said roll, to prevent loosening of said roll.

2. A method as recited in claim 1, further comprising the step of securing said shell halves to each other after said winding step.

3. A method as recited in claim 2, wherein each of said flanges has a curved rim which is in contact with an outermost convolution of said roll at a limited lateral portion thereof so as to radially confine the outermost convolution.

4. A method as recited in claim 3, wherein said separating step comprises the step of pivoting at least one of said shell halves about a pivot which is located outside said cassette shell and extends parallel to a rotational axis of said spool in a plane including said rotational axial and axial joint surfaces of said mated shell halves.

5. A method as recited in claim 4, wherein said confining elements are in contact with said flanges by an amount L when said shell halves are separated, and the amount L is not less than 0.3 mm under conditions that the external diameter of said flanges is 21.2 mm, the radial distance from said pivot to said rotational axis is 14 mm, the radial distance from said rational axis to an inner end of said confining elements is 8 mm, and the radius of curvature of said rim of said flange is 0.2 mm.

* * * * *